US012722572B2

(12) United States Patent
Lee

(10) Patent No.: US 12,722,572 B2
(45) Date of Patent: Sep. 1, 2026

(54) CONSOLE DEVICE

(71) Applicant: SEOYON E-HWA CO., LTD., Anyang (KR)

(72) Inventor: Yong Su Lee, Siheung (KR)

(73) Assignee: SEOYON E-HWA CO., LTD., Anyang (KR)

( * ) Notice: Subject to any disclaimer, the term of this patent is extended or adjusted under 35 U.S.C. 154(b) by 214 days.

(21) Appl. No.: 18/822,578

(22) Filed: Sep. 3, 2024

(65) Prior Publication Data

US 2025/0083608 A1 Mar. 13, 2025

(30) Foreign Application Priority Data

Sep. 13, 2023 (KR) ........................ 10-2023-0121898

(51) Int. Cl.
*B60R 7/04* (2006.01)

(52) U.S. Cl.
CPC ...................................... *B60R 7/04* (2013.01)

(58) Field of Classification Search
CPC .................................. B60N 2/793; B60R 7/04
See application file for complete search history.

(56) References Cited

U.S. PATENT DOCUMENTS 8,100,453 B2 1/2012 Shimajiri
11,293,206 B2 4/2022 Shimizu
2023/0302977 A1* 9/2023 Kim .......................... B60R 7/04
2025/0001945 A1* 1/2025 Woo .......................... B60R 7/04

FOREIGN PATENT DOCUMENTS

KR 10-1254841 B1 4/2013
KR 10-2108269 B1 5/2020
KR 10-2020-0064723 A 6/2020

* cited by examiner

*Primary Examiner* — Dany E Akakpo
(74) *Attorney, Agent, or Firm* — Harvest IP Law, LLP

(57) ABSTRACT

Proposed is a console device related to a technology of a console cover opening and closing control structure capable of controlling a console cover in the console device configured such that the console cover is capable of being selectively opened in a front direction or a rear direction so that the console cover is not opened in the other direction when the console cover is opened in any one direction among the front direction and the rear direction.

12 Claims, 20 Drawing Sheets

CONSOLE DEVICE

CROSS REFERENCE TO RELATED APPLICATION

The present application claims priority to Korean Patent Application No. 10-2023-0121898, filed Sep. 13, 2023, the entire contents of which are incorporated herein for all purposes by this reference.

BACKGROUND OF THE INVENTION

Field of the Invention

The present disclosure relates to a console device. More particularly, the present disclosure relates to a technology of a console cover opening and closing control structure for controlling a console device such that a console cover is capable of being selectively opened either in a front direction or a rear direction so that the console cover is not opened in the other direction when the console cover is opened in any one direction among the front direction and the rear direction.

Description of the Related Art

In the interior of a vehicle, a console device is mounted between a driver's seat and a passenger seat, and a console cover of the console device is applied as an armrest, so that comfort can be provided to a vehicle passenger and also an object is capable of being stored in a box inside the console device since the console cover is capable of being opened.

Since a conventional console device is opened only in a front direction, a passenger seated on a driver's seat or a passenger seat can conveniently open the console device, but there is an inconvenience that a passenger seated on a rear seat cannot open the console device.

In order to solve this inconvenience, a console device capable of being opened in both front and rear directions or a console device capable of being opened in both left and right directions has been proposed.

In such a console device capable of being opened in both front and rear directions, there is a problem that a console cover is separated from the console device when respective operation buttons in both directions are simultaneously operated.

Particularly, when the console cover is unintentionally separated by a user, the user may become confused. Furthermore, there is a problem that a serious accident may occur since a driver who is driving a vehicle is unable to look forward due to an unexpected situation caused by the separation of the console cover.

Furthermore, when the console cover is separated from the console device, there is a problem that the user has difficulty remounting the console cover onto the console device again.

SUMMARY OF THE INVENTION

Accordingly, the present disclosure has been made keeping in mind the above problems occurring in the related art, and an objective of the present disclosure is to provide a technology for selectively controlling an opening direction of a console cover such that the console cover is not opened in the other direction when the console cover in a console device capable of being opened in a front direction or a rear direction is opened in any one direction among the front direction and the rear direction.

Particularly, the present disclosure is intended to solve a problem that a console cover is separated from a console device when respective operation buttons in both directions of a console device capable of being opened in both directions are simultaneously operated.

Furthermore, the present disclosure is intended to solve a problem that a user may become confused due to an unintentional separation of a console cover and a serious accident may occur since a driver who is driving a vehicle is unable to look forward due to an unexpected situation caused by the separation of the console cover.

Furthermore, the present disclosure is intended to solve a problem that a user has difficulty mounting a console cover on a console device again when the console cover is separated from the console device.

The objectives of the present disclosure are not limited thereto, and other objectives and other advantages of the present disclosure will be understood from the following description.

In order to achieve the objectives as described above, according to an aspect of the present disclosure, there is provided a console device including: a front rod member configured to be moved rearward in a longitudinal direction according to an operation of a front operation button unit; a rear rod member configured to be moved forward in the longitudinal direction according to an operation of a rear operation button unit; and a console opening direction adjustment unit including an opening adjustment member configured such that a position of the opening adjustment member in the longitudinal direction is fixed between the front rod member and the rear rod member and the opening adjustment member is operable to rotate around a rotation shaft, wherein the opening adjustment member is configured such, when one side of the opening adjustment member is pushed by either one of a rearward movement of the front rod member or a forward movement of the rear rod member, the one side of the opening adjustment member is rotated around the rotation shaft and moved downward, and an opposite side of the opening adjustment member is rotated around the rotation shaft and moved upward, so that the opposite side of the opening adjustment member is in contact with the other one of the front rod member or the rear rod member, thereby restricting a movement in the longitudinal direction of the other one of the front rod member or the rear rod member.

Preferably, the front rod member may include a front center rod configured to be moved rearward in the longitudinal direction according to the operation of the front operation button unit, and the rear rod member may include a rear center rod configured to be moved forward in the longitudinal direction according to the operation of the rear operation button unit, wherein the console opening direction adjustment unit may include: the opening adjustment member including a front wing configured to be in contact with the front center rod, a rear wing configured to be in contact with the rear center rod, and the rotation shaft between the front wing and the rear wing; and an opening adjustment member mounting part configured to fix a position of the rotation shaft of the opening adjustment member and to support the rotation shaft such that the rotation shaft is capable of being rotated.

Furthermore, the console opening direction adjustment unit may further include left and right guide partition walls disposed in both left and right sides of the front center rod and the rear center rod, respectively, the left and right guide partition walls providing a movement passage therebetween and guiding the movement in the longitudinal direction of the front center rod and the rear center rod.

As an example, the opening adjustment member mounting part may include an opening adjustment member lower end mounting part which is provided on the left and right guide partition walls and into which the rotation shaft of the opening adjustment member is inserted and mounted, the opening adjustment member lower end mounting part being configured to fix and support the position of the rotation shaft and to support the rotation of the rotation shaft.

Preferably, the front rod member and the rear rod member may respectively include: a front push bar provided at a distal end of the front center rod, the front push bar being configured to push the front wing downward according to the rearward movement of the front center rod when the front wing is in a normal position and configured to be restricted from the rearward movement by being in contact with the front wing when the front wing is in an upward position; and a rear push bar provided at a distal end of the rear center rod, the rear push bar being configured to push the rear wing downward according to the forward movement of the rear center rod when the rear wing is in a normal position and configured to be restricted from the forward movement by being in contact with the rear wing when the rear wing in a upward position.

As an example, the front push bar and the rear push bar may each include: a catching surface formed as a upright surface on a distal end or formed as an inclined surface having a first inclination angle; and a guide surface formed as an inclined surface having a second inclination angle from a lower distal end of the catching surface, wherein the opening adjustment member may include: a front restriction protrusion that extends downward from a distal end of the front wing; and a rear restriction protrusion that extends downward from a distal end of the rear wing.

As an example, as the front center rod is moved rearward in the longitudinal direction according to the operation of the front operation button unit, the guide surface of the front push bar may push an upper surface of the front wing of the opening adjustment member downward by the second inclination angle casing the rotation shaft to rate and the rear wing to move upward by the second inclination angle, so that the rear restriction protrusion may be in contact with the catching surface of the rear push bar and the movement in the longitudinal direction of the rear center rod may be restricted.

As an example, as the rear center rod is moved frontward in the longitudinal direction according to the operation of the rear operation button unit, the guide surface of the rear push bar may push an upper surface of the rear wing of the opening adjustment member downward by the second inclination angle causing the rotation shaft to rotate and the front wing to move upward by the second inclination angle, so that the front restriction protrusion may be in contact with the catching surface of the front push bar and the movement in the longitudinal direction of the front center rod may be restricted.

Furthermore, the console opening direction adjustment unit may include: a front wing spring disposed below the front wing, the front wing spring being configured to apply an elastic force to the front wing as the front wing is moved downward and the front wing spring is pressed, and the front wing spring being configured to push the front wing upward with a restoration force to restore a position of the front wing; and a rear wing spring disposed below the rear wing, the rear wing spring being configured to apply an elastic force to the rear wing as the rear wing is moved downward and the rear wing spring is pressed, and the rear wing spring being configured to push the rear wing upward with a restoration force to restore a position of the rear wing, wherein the opening adjustment member may maintain a balanced state in which the opening adjustment member is not tilted due to a balance between the elastic force of the front wing spring and the elastic force of the rear wing spring when the front operation button unit and the rear operation button unit are not operated.

Furthermore, the console opening direction adjustment unit may further include a fixing cover mounted on a base plate to cover the opening adjustment member and the left and right guide partition walls, and the opening adjustment member mounting part may include an opening adjustment member upper end mounting part which is provided on both left and right side surfaces of the fixing cover and into which the rotation shaft of the opening adjustment member is inserted and mounted, the opening adjustment member upper end mounting part being configured to fix and support the position of the rotation shaft and to support the rotation of the rotation shaft.

Preferably, the console device may further include: a front locking control unit configured to control a front side opening and closing of a console cover according to the movement in the longitudinal direction of the front rod member; and a rear locking control unit configured to control a rear side opening and closing of the console cover according to the movement in the longitudinal direction of the rear rod member.

Furthermore, a simultaneous opening of the console cover at both front and rear sides may be restricted by the console opening direction adjustment unit.

According to the present disclosure, the opening direction of the console cover is capable of being controlled such that the console cover is not opened in the other direction when the console cover in the console device capable of being opened in both directions is opened in any one direction among the front direction and the rear direction.

Particularly, the problem that the console cover is separated from the console device when respective operation buttons in both directions of the console device capable of being opened in both directions are simultaneously operated may be solved.

Furthermore, the problem that the user may become confused due to the unintentional separation of the console cover and the serious accident may occur since the driver who is driving the vehicle is unable to look forward due to the unexpected situation caused by the separation of the console cover may be solved.

Furthermore, the problem that the user has difficulty mounting the console cover on the console device again when the console cover is separated from the console device may be solved.

The effects of the present disclosure are not limited to those mentioned above, and other effects not mentioned will be clearly understood by those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, exemplary embodiments of the present disclosure will be described in detail with reference to the accompanying drawings, but the present disclosure is not limited or restricted to the embodiments.

In order to explain the present disclosure, the operational advantages of the present disclosure, and the objectives achieved by the practice of the present disclosure, the embodiments of the present disclosure are exemplified below and will be described with reference thereto.

First, the terms used in this application are only used to describe specific embodiments, and are not intended to limit the present disclosure, and a singular expression may include a plural expression unless the context clearly indicates otherwise. In addition, it should be understood that in the present disclosure, terms such as “comprise” or “have” are intended to designate that a feature, number, step, operation, component, part, or combination thereof described in the specification exists, and do not preclude the possibility of addition or existence of one or more other features or numbers, steps, operations, components, parts, or combinations thereof.

In describing the present disclosure, when it is determined that a detailed description of a related known configuration or function may obscure the gist of the present disclosure, the detailed description thereof will be omitted.

In the present disclosure, there is provided a technology of a console cover opening and closing control structure in a console device, where the console cover can be selectively opened in either direction. The technology of controlling the console cover ensures that when the console cover is opened in one direction—either front or rear—, the console cover cannot be opened in the other direction.

Figure 1:
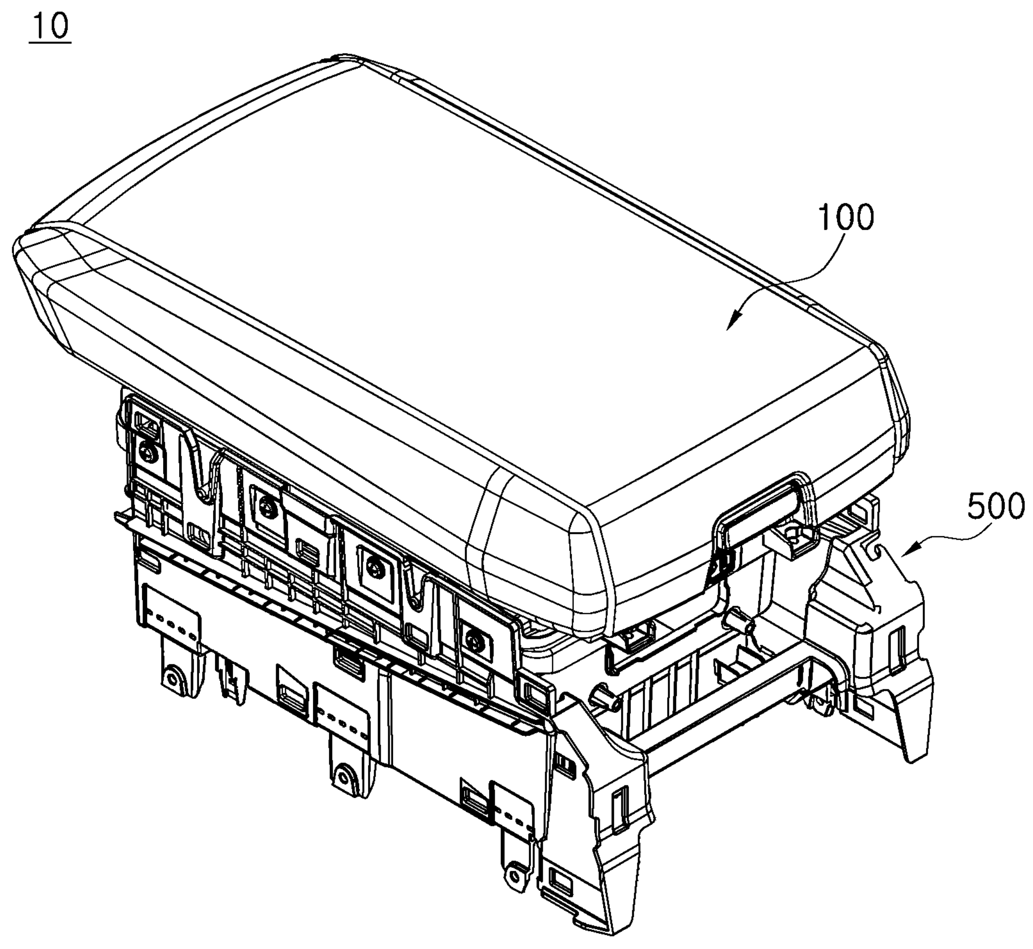
FIG. 1 is a view illustrating an example of a console device according to the present disclosure.
Figure 2A:
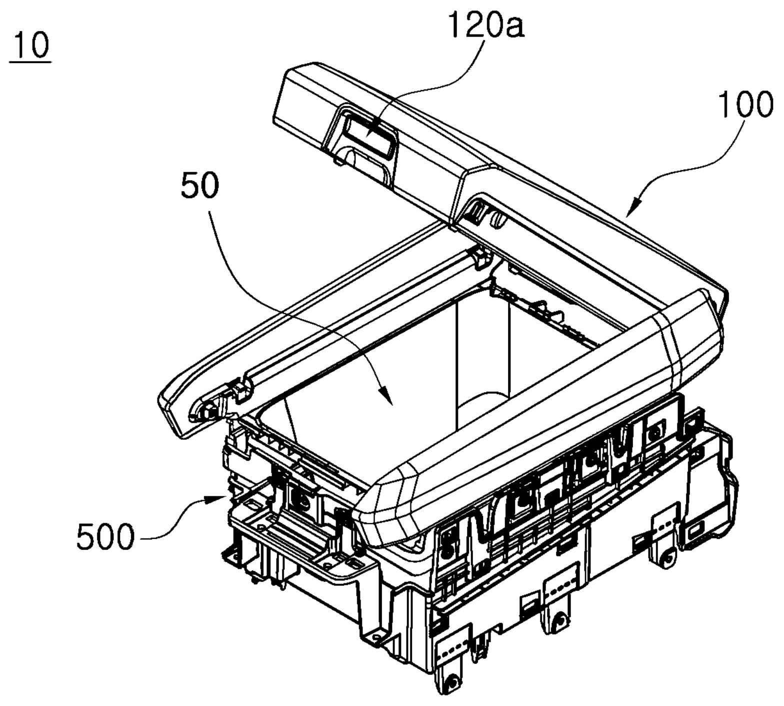
FIGS. 2A and 2B are views illustrating opened states of an embodiment of the console device according to the present disclosure in any one direction among both directions, respectively.
Figure 2B:
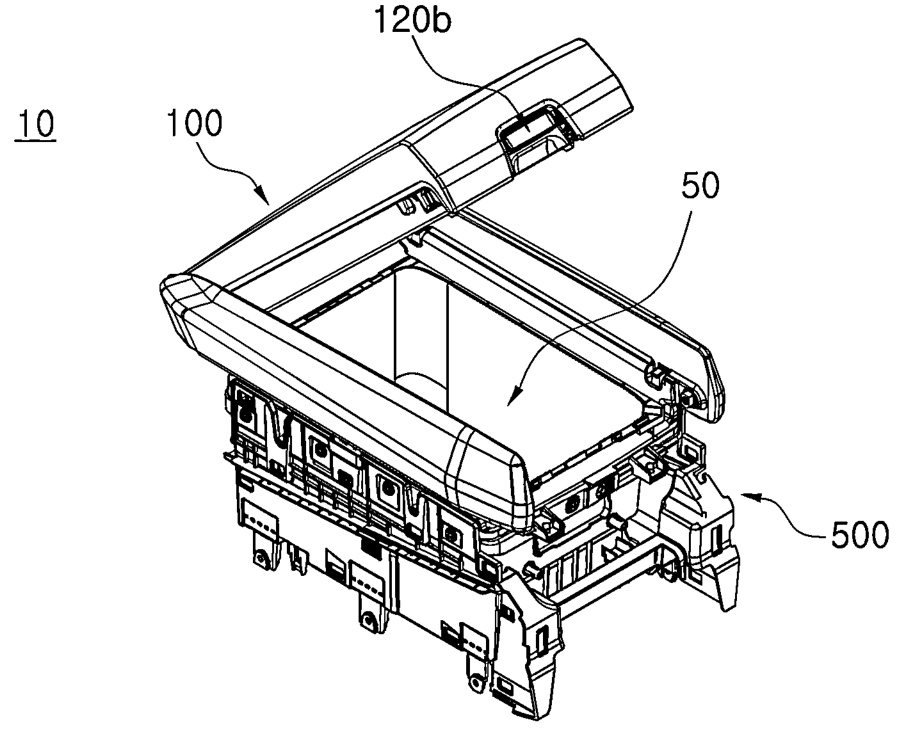

FIG. 1 is a view illustrating an example of a console device according to the present disclosure, and FIG. 2A and FIG. 2B are views illustrating opened states of the console device according to an embodiment of the present disclosure in one of both directions, respectively, namely, FIG. 2A showing an opened state in one direction and FIG. 2B showing an opened state in the opposite direction.

A console device 10 may be disposed inside of the interior of a vehicle. As an example, the console device 10 may be disposed between a driver’s seat and a passenger seat. As another example, the console device 10 may be disposed as a moving console so that the position of the console device 10 may be adjusted in the front/rear direction and an internal space of the vehicle can be fully utilized for application in an autonomous driving vehicle.

The console device 10 may include, among other, a console body 500, and a console cover 100. A storage space 50 capable of storing an object therein may be provided inside the console body 500. The console cover 100 is supported on the console body 500 and is mounted on an upper portion of the console body 500. The console cover 100 is capable of closing or opening the storage space 50. Furthermore, the console cover 100 may function as an armrest for providing convenience to a passenger.

The console device 10 proposed in the present disclosure may be the console device 10 configured such that the console cover 100 is capable of being selectively opened in a front direction or a rear direction.

For example, as illustrated in FIG. 2A, a front operation button unit 120*a*, which allows the console cover 100 to be opened in the front direction, may be disposed on the front side of the console cover 100. This setup enables a passenger to open the console cover 100 in the front direction by controlling a front operation button.

In addition, as illustrated in FIG. 2B, a rear operation button unit 120*b*, which allows the console cover 100 to be opened in the rear direction, may be disposed on the rear side of the console cover 100. This setup enables a passenger to open the console cover 100 in the rear direction by controlling a rear operation button.

As such, in the present disclosure, the console device 10 is configured such that the console cover 100 is capable of being selectively opened in the front direction and the rear direction, and the console device 10 will be described in detail through specific embodiments.

Figure 3:
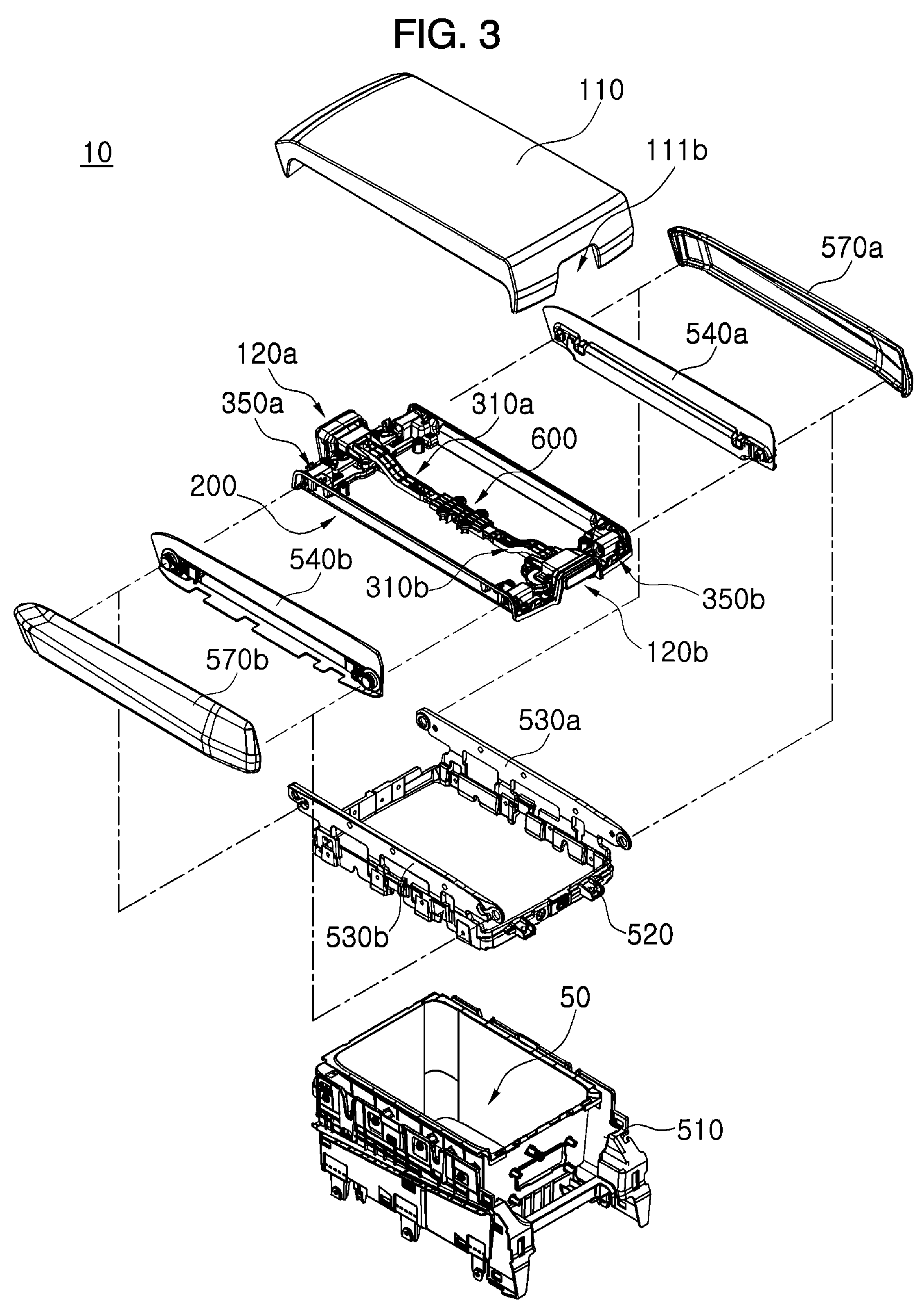
FIG. 3 is an exploded perspective view illustrating an embodiment of the console device according to the present disclosure.

FIG. 3 is an exploded perspective view illustrating an embodiment of the console device according to the present disclosure.

The console device 10 may include the console body 500 and the console cover 100.

The console body 500 may include, among others, a body frame 510, a support frame 520, left and right guide plates 540*a* and 540*b*, and left and right side covers 570*a* and 570*b*.

The body frame 510 may be provided with the storage space 50 capable of storing an object therein. The body frame 510 may be fixedly disposed on a specific position in the vehicle. For example, the body frame 510 may be fixedly disposed between the driver’s seat and the passenger seat.

Alternatively, the body frame 510 may be coupled to a moving device (not illustrated), so that a position of the body frame 510 is capable of being moved inside the vehicle.

Throughout the specification, the front side, the rear side and the left side, the right side of the console device may be defined based on the front direction, the rear direction and the left side, the right side of the vehicle in which the console device is installed assuming that the console device is installed between the driver's seat and the passenger seat.

The support frame 520 may be coupled to an upper portion of the body frame 510. The support frame 520 may support opening and closing of the console cover 100 while supporting the console cover 100. Both sides (i.e., left and right sides) of the support frame 520 may be respectively provided with support legs 530*a* and 530*b* that extend upward.

The guide plates 540*a* and 540*b* and the side covers 570*a* and 570*b* may be coupled and fastened to each other around the support legs 530*a* and 530*b* (i.e., having the support legs 530*a* and 530*b* therebetween). That is, support leg 530*a* may be coupled with the guide plate 540*a* and the side cover 570*a* such that, when coupled, the support let 530*a* is disposed between the guide plate 540*a* and the side cover 570*a*. The guide plate 540*b*, the side cover 570*b* and the support leg 530*b* may be coupled in a similar manner.

In a state in which the guide plates 540*a* and 540*b* and the side covers 570*a* and 570*b* are coupled to each other around the both support legs 530*a* and 530*b* of the support frame 520, the console cover 100 may be coupled in the middle between the support legs 530*a* and 530*b*.

The console cover 100 may include a console cover opening and closing device 200 and an upper cover 110.

When both of the front side and the rear side of the console cover 100 are closed, the console cover opening and closing device 200 may restrict opening of the console cover 100 by being coupled to the guide plates 540*a* and 540*b*.

In addition, according to the operation of the operation button units 120*a* and 120*b* by the passenger, the console cover opening and closing device 200 is configured such that the console cover 100 can be opened in one direction—either the front or rear—while the opposite side of the console cover 100 is supported and rotated on the guide plates 540*a* and 540*b*, thereby allowing a control of the selective opening of the console cover 100 in both directions.

The console cover opening and closing device 200 may include, among others, a front rod member 310*a*, and a front locking control unit 350*a* for controlling a front opening and closing of the console cover 100 according to the operation of the front operation button unit 120*a*. The console cover opening and closing device 200 may also include, among others, a rear rod member 310*b*, and a rear locking control unit 350*b* for controlling a rear opening and closing of the console cover 100 according to the operation of the rear operation button unit 120*b*.

Particularly, the console cover opening and closing device 200 may be provided with a console opening direction adjustment unit 600 for allowing the console cover to be opened only in one direction—either front or rear=according to the operation of the operation button units 120*a* and 120*b* while simultaneously restricting the console cover from being opened in the opposite direction.

The upper cover 110 may cover an upper portion of the console cover opening and closing device 200 so that the configuration of the console cover opening and closing device 200 is not exposed. Here, the upper cover 110 may function as an armrest for providing convenience to the passenger as well.

The console cover opening and closing device 200, which controls the opening and closing operation of the console cover 100, will be described with reference to FIG. 4 to FIG. 6.

Figure 4:
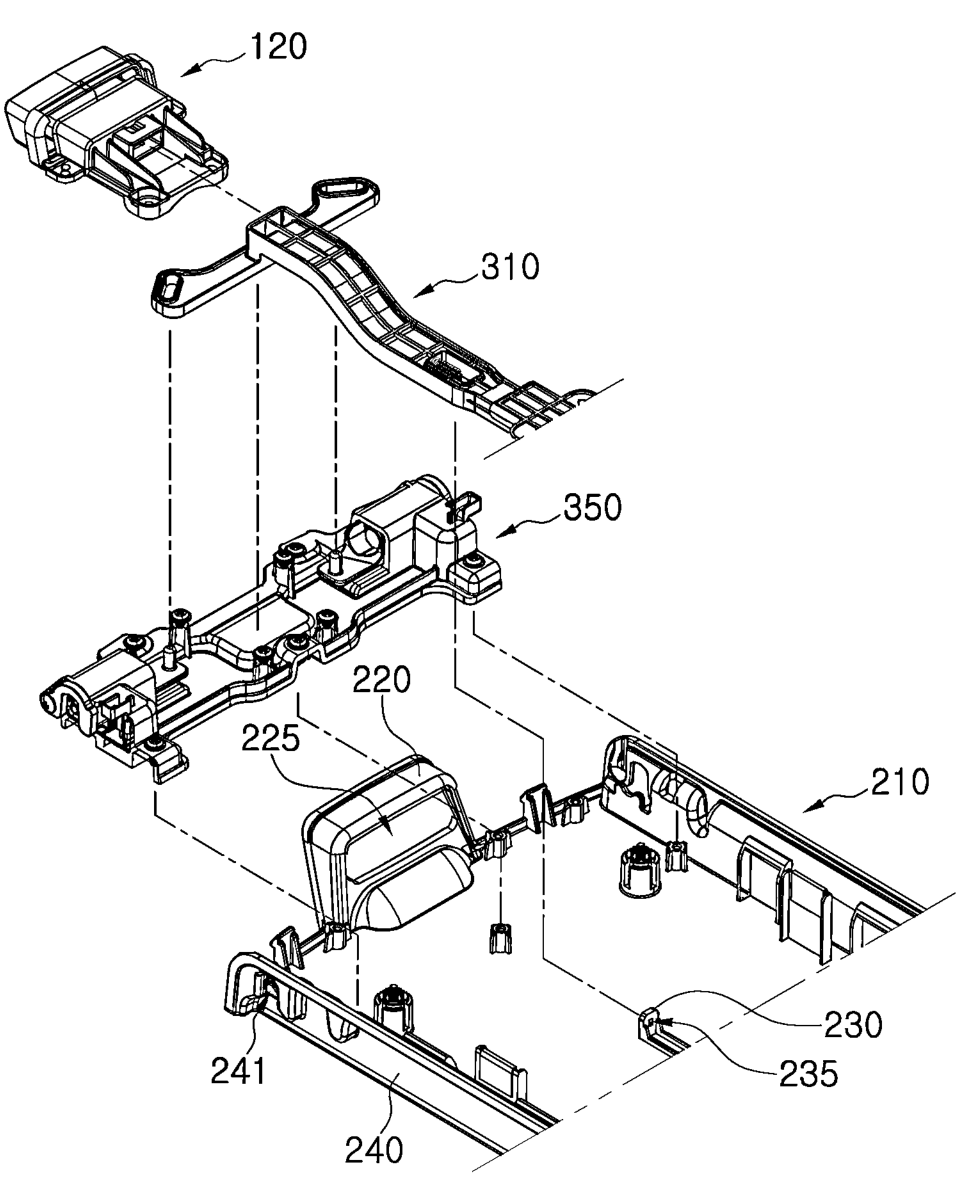
FIG. 4 is an exploded perspective view illustrating an embodiment of a console cover opening and closing device in the console device according to the present disclosure.
Figure 5:
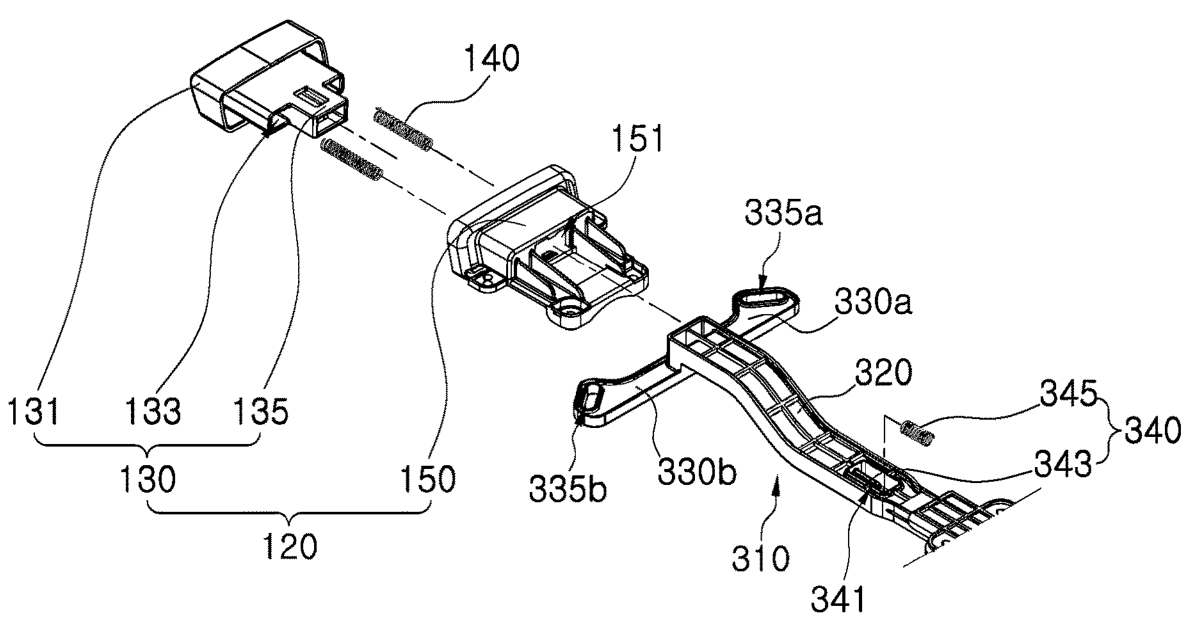
FIG. 5 and FIG. 6 are exploded perspective views illustrating each configuration of an embodiment of the console cover opening and closing device according to the present disclosure.
Figure 6:
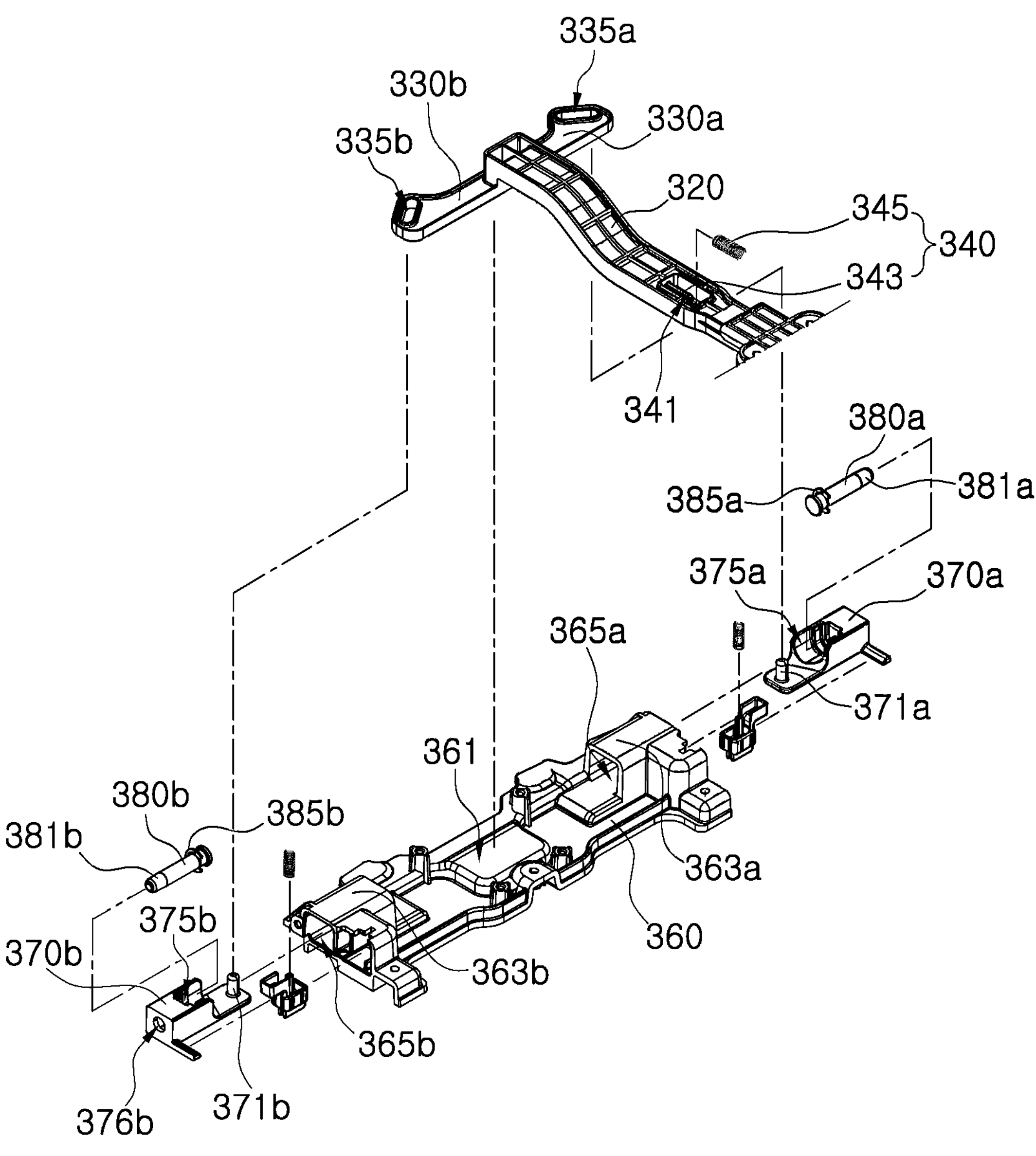

FIG. 4 is an exploded perspective view illustrating an embodiment of a console cover opening and closing device in the console device according to the present disclosure, and FIG. 5 and FIG. 6 are exploded perspective views illustrating each configuration of an embodiment of the console cover opening and closing device according to the present disclosure.

In the console cover opening and closing device 200, the mechanism for opening and closing the front side of the console cover 100 and the configuration for opening and closing the rear side of the console cover 100 are symmetrically similar to each other. Therefore, in FIG. 4 to FIG. 6, the console cover opening and closing device 200 will be described without distinguishing the front side and the rear side thereof.

The console cover opening and closing device 200 may include, among others, the operation button unit 120, a base plate 210, the rod member 310, and the locking control unit 350.

In a state in which the operation button unit 120, the rod member 310, the locking control unit 350 together with other elements are mounted on an upper portion of the base plate 210, the upper cover 110 may be mounted on the upper portion of the base plate 210 such that the upper cover 110 covers the upper portion of the base plate 210.

The operation button unit 120 may include, among others, an operation button body 130, an operation button support cover 150, and an operation button return spring 140.

The operation button body 130 may include a button part 131 at one side that is operated by the passenger. In the middle of the operation button body 130, a return spring mounting part 133 is provided such that a first side of the operation button return spring 140 is inserted in to the return spring mounting part 133. The operation button body 130 may include an operation part 135 at the opposite side such that the operation part 135 is in contact with a distal end of a center rod 320 of the rod member 310. The operation part 135 is configured to push and move the center rod 320 rearward in a longitudinal direction thereof according to the operation of the passenger.

Throughout the specification, the longitudinal direction refers to a direction in which the center rod 320 is elongated and is the same direction from the front side to the rear side. The movement rearward refers to movement in the direction in which the button part 131 is pushed. Also, an upward direction (i.e. a direction from the console body 500 toward the console cover 100) and a downward direction (i.e., a direction from the console cover 100 toward the console body 500) may be collectively referred to as a height direction.

The operation button support cover 150 may be provided with an operation button insertion hole 151 into which a portion of the operation button body 130 is inserted. Furthermore, in a state in which the portion of the operation button body 130 is inserted into the operation button insertion hole 151, the operation button body 130 may be moved while the operation button body 130 is supported through the operation button support cover 150 according to the operation of the passenger.

The operation button support cover 150 may be mounted on a support plate 360 of the locking control unit 350, and a front region of the operation button support cover 150 may be inserted into a support hole 225 of an operation button support part 220 provided on the base plate 210 and may be supported in the support hole 225.

A second side of the operation button return spring 140 may be connected to the operation button support cover 150. The operation button body 130 may be pushed rearward according to the operation of the button part 131 by the passenger, and the operation button return spring 140 may be pressed between the operation button body 130 and the operation button support cover 150, so that an elastic force may be provided. Furthermore, when the operation of the button part 131 by the passenger is released, the operation button return spring 140 may push and return the operation button body 130 to an original position by a restoration force while the operation button return spring 140 is supported by the operation button support cover 150.

The rod member 310 may include, among others, the center rod 320, left and right arms 330*a* and 330*b*, and a center rod return mechanism 340.

The center rod 320 may be formed such that the center rod 320 extends in a longitudinal direction thereof. An end region of a front end of the center rod 320 may be in contact with the operation part 135 of the operation button body 130. The center rod 320 may be pushed and moved along the longitudinal direction as by the user operates the operation button unit 120.

The arms 330*a* and 330*b* may be provided such that the arms 330*a* and 330*b* extend outward to side surfaces of the center rod 320. The arms 330*a* and 330*b* may extend perpendicularly to the longitudinal direction from the front end of the center rod 320. Guide holes 335*a* and 335*b*, with a predetermined length oriented diagonally relative to an extension direction of the arms 330*a* and 330*b*, may be provided in the arms 330*a* and 330*b*. The guide holes 335*a* and 335*b* may be long holes having the predetermined length. The guide holes 335*a* and 335*b* in a long hole shape is diagonally oriented such that front ends of the guide holes 335*a* and 335*b* are positioned relatively inner side than the rear ends of the guide holes 335*a* and 335*b*.

Throughout the specification, the direction in which the arms 330*a* and 330*b* extends from the center rod 320 may be referred to as an outward direction. Also, an opposite direction to the outward direction, which is a direction from distal ends of the arms 330*a* and 330*b* toward the center rod 310, may be referred to as an inward direction. A side positioned relatively outward may be referred to as an outer side and a side positioned relatively inward may be referred to as an inner side. The outward direction and the inward direction may be collectively referred to as a horizontal direction.

The length of the guide holes 335*a* and 335*b* may be set in consideration of a movement distance of the center rod 320 according to the operation of the operation button unit 120 and a movement distance of locking rods 380*a* and 380*b* for opening and closing the console cover 100.

The center rod 320 may be provided with the right arm 330*a* and the left arm 330*b* which extend toward the both left and right side surfaces of the center rod 320, respectively. The right guide hole 335*a* may be provided in the right arm 330*a*, and the left guide hole 335*b* may be provided in the left arm 330*b*. The right arm 330*a* and the left arm 330*b*, including the guide holes 335*a* and 335*b*, may be formed in shapes symmetrical to each other with respect to the center rod 320. The guide holes 335*a* and 335*b* may be formed at ends of the arms 330*a* and 330*b*, respectively.

The center rod return mechanism 340 may return the center rod 320, which has been moved in the longitudinal direction, to the original position according to the operation of the operation button unit 120.

As an example, the center rod return mechanism 340 may be disposed in a middle end of the center rod 320. A through hole 341 may be provided in the middle end of the center rod 320, a center rod return bar 343 that protrudes rearward from an inner side wall of the through hole 341 may be formed, and a center rod return spring 345 may be mounted on the center rod return bar 343.

A center rod return support protrusion 230 which protrudes upward and which corresponds to a position of the through hole 341 of the center rod 320 may be provided on the base plate 210. A support hole 235 into which the center rod return bar 343 is inserted and in which the center rod return bar 343 is capable of being moved may be formed in the center rod return support protrusion 230.

In a state in which the center rod return spring 345 is mounted on the center rod return bar 343, a distal end of the center rod return bar 343 may be inserted into and fastened to the support hole 235 of the center rod return support protrusion 230.

The locking control unit 350 may include, among others, the support plate 360, locking adjustment members 370*a* and 370*b*, and the locking rod 380*a* and 380*b*.

The support plate 360 may be mounted on the base plate 210.

The support plate 360 may provide a movement space 361 in which the center rod 320 is capable of being moved in the longitudinal direction of the center rod 320.

Locking adjustment member fastening parts 363*a* and 363*b* to which the locking adjustment members 370*a* and 370*b* are fastened may be provided on both left and right sides of the support plate 360.

As an example, the locking adjustment member fastening parts 363*a* and 363*b* may be formed in tunnel shapes, and may be provided with locking adjustment member movement spaces 365*a* and 365*b* so that the locking adjustment members 370*a* and 370*b* are capable of being moved in a horizontal direction within the tunnel shapes of the locking adjustment member fastening parts 363*a* and 363*b*.

The right locking adjustment member 370*a* may be fastened to the right side of the support plate 360, and the left locking adjustment member 370*b* may be fastened to the left side of the support plate 360.

Locking adjustment protrusions 371*a* and 371*b* which protrude upward may be provided on each first side of the locking adjustment members 370*a* and 370*b*. The locking adjustment protrusions 371*a* and 371*b* may be inserted into and fastened to the guide holes 335*a* and 335*b* provided in the arms 330*a* and 330*b* of the center rod 320.

The locking adjustment protrusions 371*a* and 371*b* may be moved according to a guide of the guide holes 335*a* and 335*b*. As the locking adjustment protrusions 371*a* and 371*b* are moved, the locking adjustment members 370*a* and 370*b* may be moved in the horizontal direction.

Locking rod fastening parts 375*a* and 375*b* into which the locking rods 380*a* and 380*b* are inserted and fastened may be provided on each second side of the locking adjustment members 370*a* and 370*b*. The second sides of the locking adjustment members 370*a* and 370*b* may be positioned relatively outward than the first sides of the locking adjustment members 370*a* and 370*b*. Slots into which protrusion parts 385*a* and 385*b* of the locking rods 380*a* and 380*b* are inserted may be provided in the locking rod fastening parts 375*a* and 375*b*. Through holes 376*a* and 376*b* into which catching parts 381*a* and 381*b* of the locking rods 380*a* and 380*b* are inserted and penetrate may be formed in each distal end of the locking rod fastening parts 375*a* and 375*b*.

The protrusion parts 385*a* and 385*b* may be provided along each inner region circumference of the locking rods 380*a* and 380*b*, and the catching parts 381*a* and 381*b* may be provided on each outer distal end of the locking rods 380*a* and 380*b*.

The locking rods 380*a* and 380*b* may be inserted into the locking rod fastening parts 375*a* and 375*b* of the locking adjustment members 370*a* and 370*b* such that the catching parts 381*a* and 381*b* pass through the through holes 376*a* and 376*b* of the locking adjustment members 370*a* and 370*b* and the catching parts 381*a* and 381*b* exposed outwardly, and the protrusion parts 385*a* and 385*b* may be inserted into the slots of the locking adjustment members 370*a* and 370*b* such that the protrusion parts 385*a* and 385*b* are mounted in the slots.

On each of both sides of the base plate 210, a side partition wall 240 may be provided. Also, on each of both side partition walls, a locking rod moving hole 241 is provided. Through the locking rod moving holes 241 on both sides, the locking rods 380*a* and 380*b* of the locking control unit 350 pass and are capable of being moved. The locking rods 380*a* and 380*b* may be inserted into or pulled out from locking holes provided in the guide plates 540*a* and 540*b* while the locking rods 380*a* and 380*b* pass through and move in the locking rod moving holes 241 provided in the side partition walls 240 of the base plate 210.

The locking rods 380*a* and 380*b* may perform a locking function that closes the opening of the console cover 100 at one side (either front or rear), and may also perform a hinge function that supports the rotation of the console cover 100 when the console cover 100 is opened at the opposite side (either rear or front, respectively).

In this regard, an example of implementing the locking function and the hinge function of the console cover in the console device according to the present disclosure illustrated in FIG. 7A and FIG. 7B will be described.

Figure 7A:
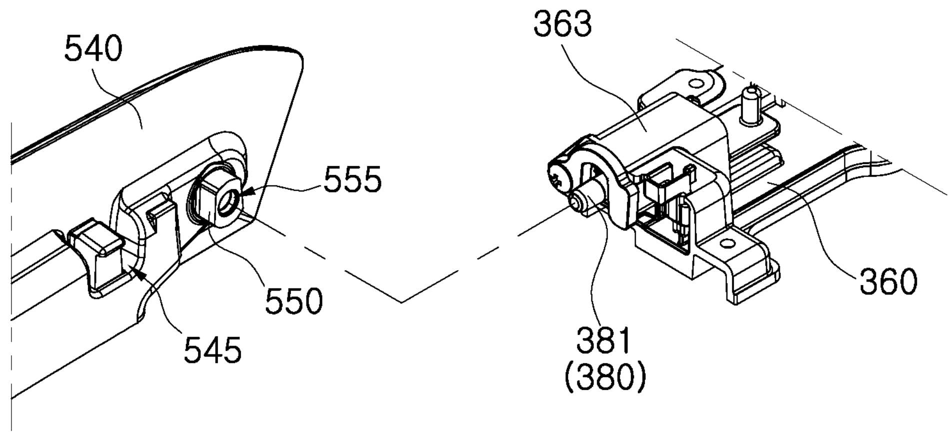
FIGS. 7A and 7B are views illustrating an example of implementing a locking function and a hinge function of a console cover in the console device according to the present disclosure.
Figure 7B:
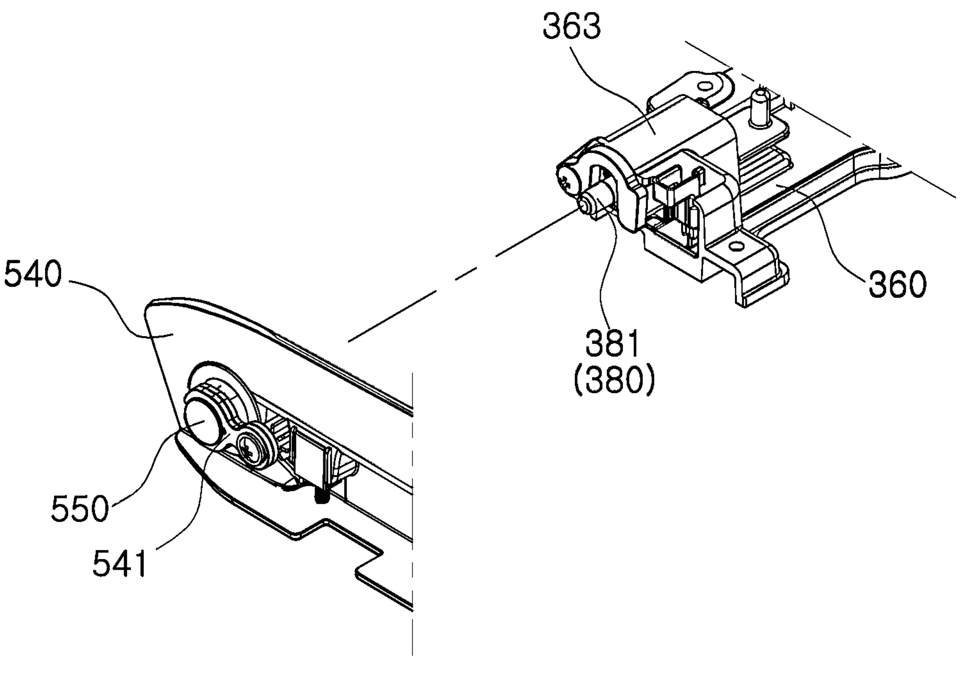

In FIG. 7A and FIG. 7B, the base plate 210 is omitted for convenience of description.

The guide plate 540 is provided with a catching member 550, and the catching member 550 may be mounted in the guide plate 540 by penetrating the guide plate 540. A locking hole 555 may be provided in a first side of the catching member 550 corresponding to the catching part 381 of the locking rod 380. The first side of the catching member 550 may mean an inner side of the catching member 550.

As the locking rod 380 is supported by the locking adjustment member fastening part 363 of the support plate 360 and the locking rod 380 is moved outward in the horizontal direction, the catching part 381 of the locking rod 380 is inserted into the locking hole 555 of the catching member 550, so that the console cover 100 may be closed and opening of the console cover 100 may be restricted. In other words, for example, when the catching part 381 of the locking rod 380 is inserted into the locking hole 555 of the catching member 550 at the front side of the console cover 100, the front side of the console cover 100 is locked and its opening is restricted.

Conversely, as the locking rod 380 is moved inward in the horizontal direction toward an inside of the locking adjustment member fastening part 363 of the support plate 360, the catching part 381 of the locking rod 380 is pulled out from the locking hole 555 of the catching member 550, so that the console cover 100 may be opened. In other words, for example, when the catching part 381 of the locking rod 330 is pulled out from the locking hole 555 of the catching member at the front side of the control cover 100, the front side of the console cover 100 is unlocked and becomes a state available to be opened.

A slewing ring 541 may be provided by being fixed and mounted on the guide plate 540. A second side (i.e., outer side) of the catching member 550 is fastened to the slewing ring 541. The catching member 550 may be rotated on the slewing ring 541 while the catching member 550 is held and supported on the slewing ring 541. A bearing may be provided so as to facilitate the rotation of the catching member 550. For example, the catching member 550 may be configured as a bearing and a member of the locking hole 555 by fitting the member of the locking hole 555 on the bearing.

The operation of the console cover opening and closing device 200 controlling the opening and closing operation of the console cover 100 in the front side and the rear side of the console cover 100 may be implemented by a configuration in FIG. 4 to FIG. 6.

In the present disclosure, the opening and closing operation of the console cover through the console cover opening and closing device will be described with reference to FIG. 8 and FIG. 9.

Figure 8A:
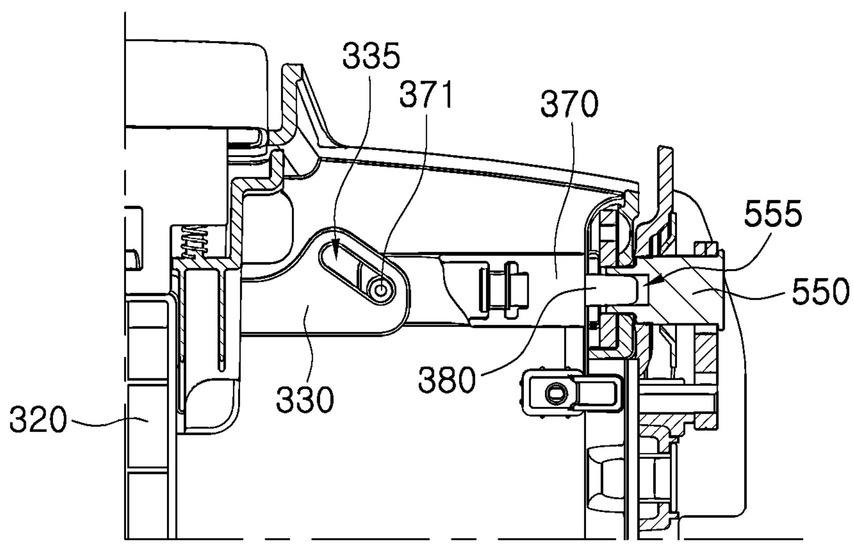
FIGS. 8A, 8B, 8C and FIGS. 9A, 9B, 9C are views illustrating operation diagrams of an embodiment of the console cover opening and closing device in the console device according to the present disclosure.
Figure 8B:
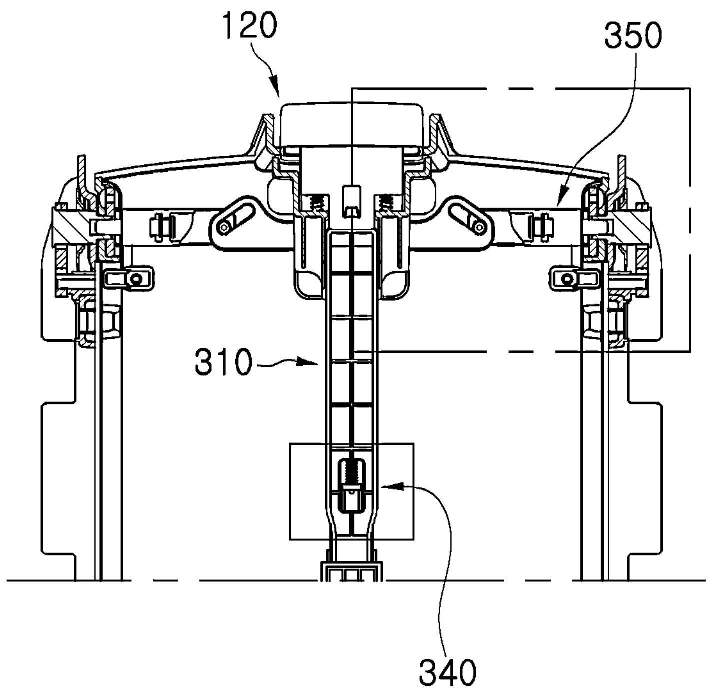
Figure 8C:
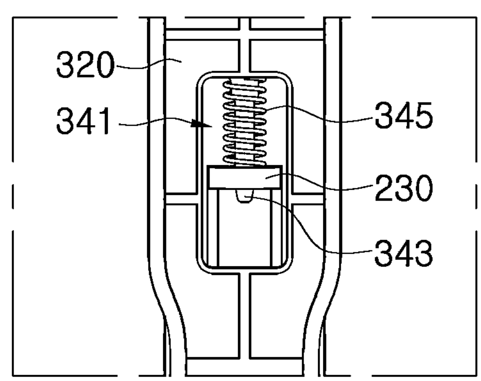

FIGS. 8A, 8B, and 8C are views illustrating an example of a state in which the console cover is closed through the console cover opening and closing device 200. Especially, FIG. 8A is an enlarged view of a front portion of the console cover opening and closing device 200 shown in FIG. 8B, and FIG. 8C is an enlarged view of a center rod return mechanism 340 shown in FIG. 8B In the normal state in which the passenger does not operate the operation button unit 120, an initial position of the rod member 310 may be maintained, and the locking control unit 350 may maintain a closed state so that the console cover 100 is locked and not opened by impact or shaking.

More specifically, in a state in which the passenger does not operate the operation button unit 120, the first side (i.e., front end) of the center rod return spring 345 of the center rod return mechanism 340 moves the center rod 320 in the longitudinal direction (i.e., forward) by the elastic force while the center rod return spring 345 is supported on the center rod return support protrusion 230, so that the initial position of the center rod 320 may be maintained.

As the initial position of the center rod 320 is maintained by a support from the center rod return mechanism 340, the guide hole 335 provided in the arm 330 of the center rod 320 may guide the locking adjustment protrusion 371 of the locking adjustment member 370 to be in an initial position of the locking adjustment protrusion 371. Here, the initial position of the locking adjustment protrusion 371 may be a lower end in the diagonal direction of the guide hole 335 (i.e., a rearmost and outermost position in the guide hole 335).

According to the guide of the guide hole 335, the initial position of the locking adjustment protrusion 371 may be maintained, and the locking adjustment member 370 in the initial position may be moved and positioned on the outermost side in the horizontal direction within a movable range.

As the locking adjustment member 370 is moved and positioned on the outermost side in the horizontal direction, the locking rod 380 may also be moved to the outermost side in the horizontal direction within a movable range, and the locking rod 380 may be inserted into and fixed to the locking hole 555 provided in the catching member 550 of the guide plate 540.

That is, in the normal state in which the passenger does not operate the operation button unit 120, the initial position of the center rod 320 is maintained by the center rod return mechanism 340, the locking adjustment protrusion 371 of the locking adjustment member 370 is positioned at the outermost side in the horizontal direction within the movable range according to the guide of the guide hole 335 of the arm 330 in the initial position of the center rod 320, and the locking rod 380 is positioned at the outermost side in the horizontal direction within the movable range by the locking adjustment member 370 and the locking rod 380 is inserted into the locking hole 555 provided in the catching member 550 of the guide plate 540 such that the position of the locking rod 380 is fixed and maintained, so that the closed state of the console cover 100 may be maintained stably.

Figure 9A:
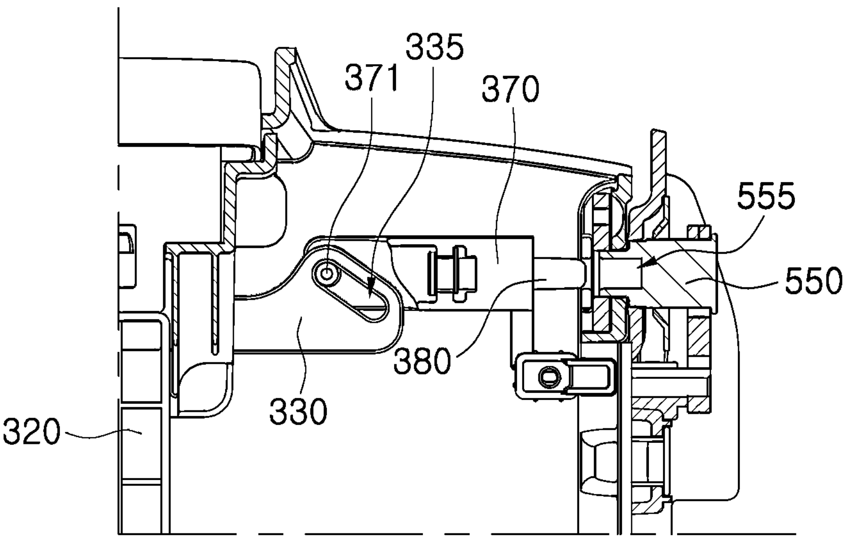
Figure 9B:
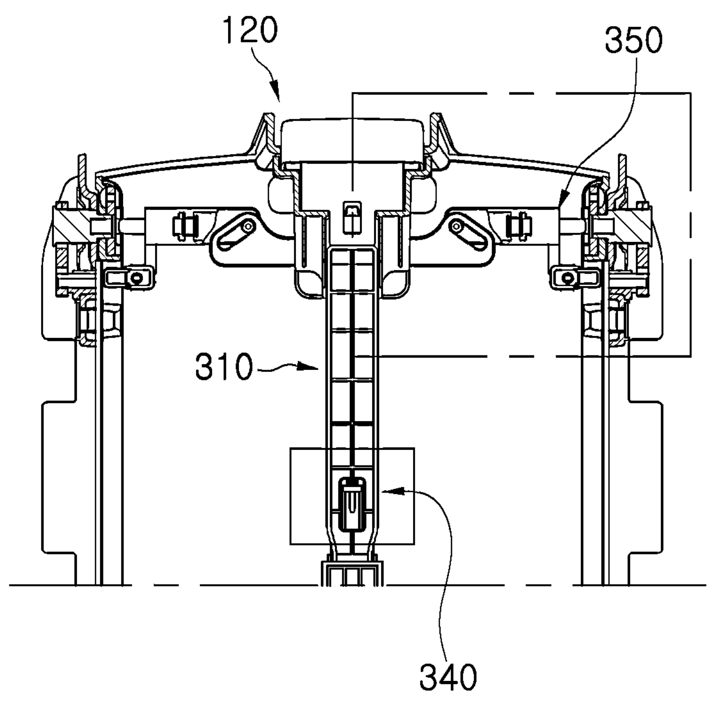
Figure 9C:
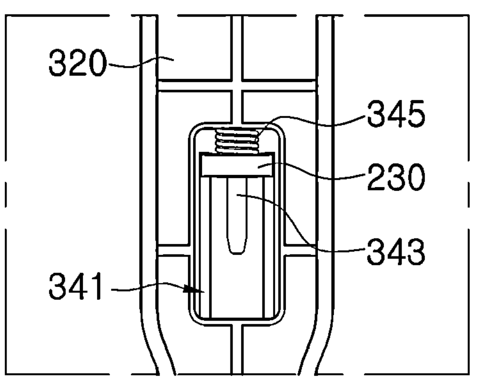
Figure 12A:
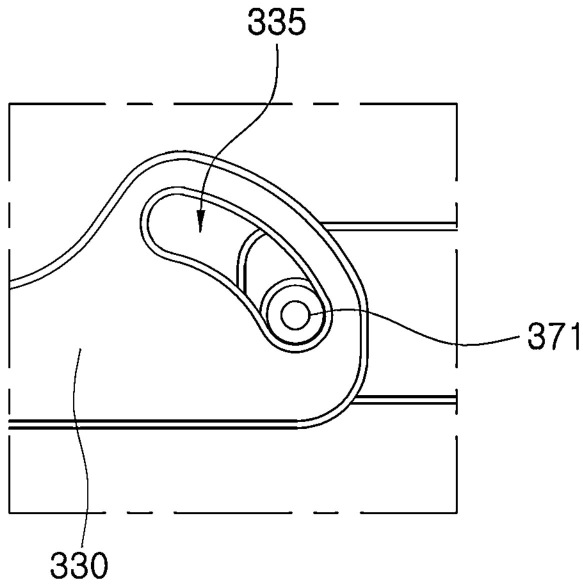
Figure 12B:
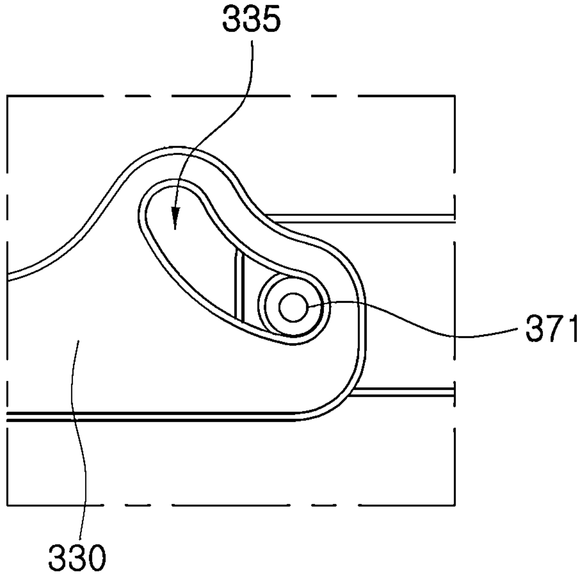

FIGS. 9A, 9B, and 9C are views illustrating an example of a state in which the console cover is opened (i.e., unlocked) through the console cover opening and closing device 200. Especially, FIG. 12A is an enlarged view of a front portion of the console cover opening and closing device 200 shown in FIG. 12B, and FIG. 12C is an enlarged view of a center rod return mechanism 340 shown in FIG. 12B.

In the operation state in which the passenger operates the operation button unit 120, the rod member 310 may be pushed rearward in the longitudinal direction and is moved to an operation position, and the locking control unit 350 may be configured to open (i.e., unlock) the console cover 100 by the movement of the rod member 310.

More specifically, when the passenger operates the operation button unit 120, the center rod 320 may be pushed rearward in the longitudinal direction by the operation button unit 120, and the center rod 320 may be moved to the operation position.

As the center rod 320 is moved rearward in the longitudinal direction to the operation position, the arm 330 of the center rod 320 may be moved accordingly, and the locking adjustment protrusion 371 may be pulled inward in the horizontal direction and may be moved to the operation position according to the guide of the guide hole 335 of the arm 330. Here, the operation position of the locking adjustment protrusion 371 may be an upper end in the diagonal direction of the guide hole 335 (i.e., a frontmost and innermost position in the guide hole 335).

The locking adjustment protrusion 371 may be moved to the operation position according to the guide of the guide hole 335, and the locking adjustment member 370 may be moved to the innermost side in the horizontal direction within the movable range according to the movement of the locking adjustment protrusion 371.

As the locking adjustment member 370 is moved to the innermost side in the horizontal direction, the locking rod 380 may also be moved to the innermost side in the horizontal direction within the movable range, and the locking rod 380 may be pulled out from the locking hole 555 provided in the catching member 550 of the guide plate 540.

That is, in the operation state in which the passenger operates the operation button unit 120, the center rod 320 is moved rearward from the initial position to the operation position by the operation button unit 120, the locking adjustment protrusion 371 of the locking adjustment member 370 is moved to the innermost side in the horizontal direction within the movable range according to the guide of the guide hole 335 of the arm 330 while the center rod 320 is moved, and the locking rod 380 is moved to the innermost side in the horizontal direction within the movable range by the locking adjustment member 370 and the locking rod 380 is pulled out from the locking hole 555 provided in the catching member 550 of the guide plate 540, so that the closed state of the console cover 100 may be released and the console cover 100 may be opened (i.e., unlocked).

In addition, when the operation of the operation button unit 120 by the passenger is released, the center rod 320 is moved back from the operation position to the initial position by the elastic force from the center rod return mechanism 340. Furthermore, as the center rod 320 is moved to the initial position, the locking control unit 350 may return the console cover 100 to the closed state. Since the closed state of the console cover 100 through the locking control unit 350 is the same as description with reference to FIGS. 8A, 8B, and 8C, a detailed description of the closed state of the console cover 100 will be omitted.

The opening and closing operation of the console cover 100 through the console cover opening and closing device 200, which is described through an embodiment illustrated in FIGS. 8A, 8B, 8C and FIGS. 9A, 9B, 9C, may be applied to both the front side and the rear side of the console cover 100.

Furthermore, in the present disclosure, the amount of operation work required for the operation button unit 120 for opening the console cover 100 can be adjusted. This adjustment process will be described through subsequent embodiments.

FIG. 10A to FIG. 13B are views illustrating various embodiments of the console cover opening and closing device for adjusting the amount of operation work for opening the console cover in the console device according to the present disclosure. In describing the present embodiment, an embodiment illustrated in FIG. 11 to FIG. 12B will be referred to together.

As described above, opening and closing of the console cover 100 may be controlled by moving the locking adjustment protrusion 371 according to the guide of the guide hole 335 provided in the arm 330 of the center rod 320. In the present disclosure, by adjusting the guide hole 335 provided in the arm 330 of the center rod 320, the amount of operation work required for opening the console cover 100 may be adjusted. Here, the amount of operation work refers to the amount of work required by the passenger in operating the operation button unit 120 for opening the console cover 100.

Figure 10A:
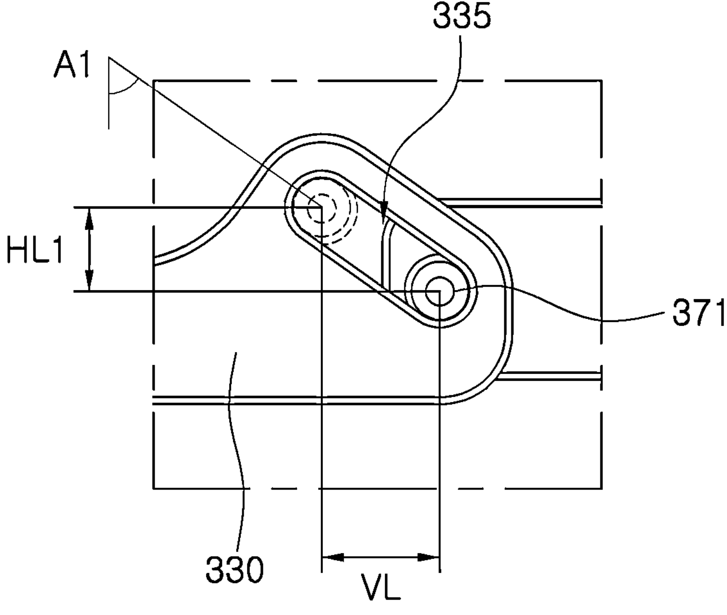
FIG. 10A to FIG. 13B are views illustrating various embodiments of the console cover opening and closing device for adjusting an amount of operation work for opening the console cover in the console device according to the present disclosure.
Figure 10B:
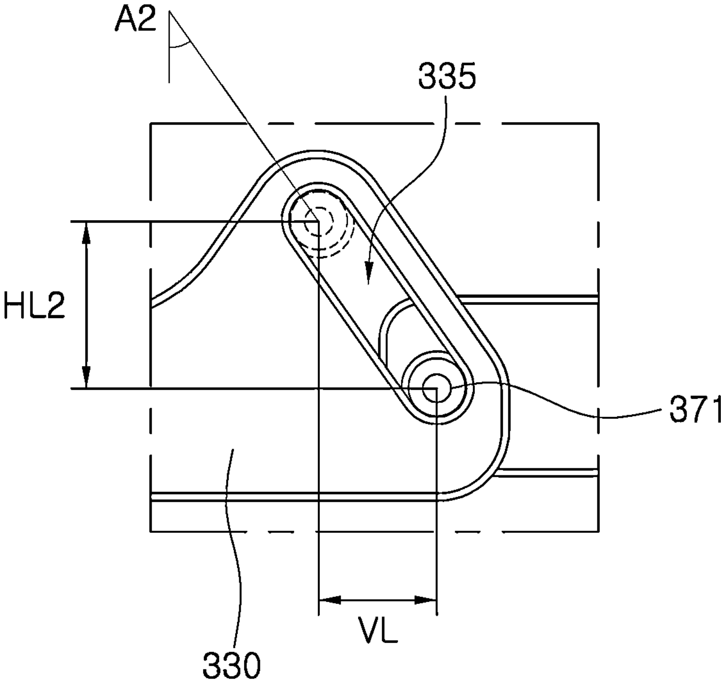

As an example, referring to FIG. 10A and FIG. 10B, in a situation in which the locking adjustment protrusion 371 is positioned at the lower end in the diagonal direction of the guide hole 335 (i.e., rearmost and outermost position in the guide hole 335), the console cover 100 may be in the normal state in which the closed state of the console cover 100 is maintained. In addition, in a situation in which the locking adjustment protrusion 371 is positioned at the upper end in the diagonal direction of the guide hole 335 (i.e., frontmost and innermost position in the guide hole 335), the console cover 100 may be in the operation state in which the console cover 100 is opened.

As the locking adjustment protrusion 371 is moved between the lower end and the upper end in the diagonal direction of the guide hole 335, the normal state in which the console cover 100 is closed and the operation state in which the console cover 100 is opened may be switched.

In the normal state in which the console cover 100 is closed, a stable closure may be maintained when the locking rod 380 is inserted into the locking hole 555 of the catching member 550 by a level equal to or more than a predetermined level. Furthermore, in order for the console cover 100 to be switched to the operation state in which the console cover 100 is opened, the locking rod 380 is required to be fully pulled out from the locking hole 555 of the catching member 550.

The movable range of the locking adjustment protrusion 371 in the guide hole 335 may correspond to the movable range between the position of the locking rod 380 in the normal state for maintaining the closure and the position of the locking rod 380 in the operation state for opening.

That is, a horizontal length VL of the diagonally oriented guide hole 335 may be a horizontal movable range of the locking adjustment protrusion 371. Also, the horizontal length VL may correspond to the movable range of the locking rod 380.

In addition, vertical lengths HL1 and HL2 of the diagonally oriented guide hole 335 may be a distance in which the operation button body 130 of the operation button unit 120 is moved according to the operation of the passenger, and the vertical lengths HL1 and HL2 may correspond to the movement distance in the longitudinal direction of the center rod 320. Throughout the specification, a vertical length of an object means a length of the object measured in the longitudinal direction.

According to an embodiment, a horizontal length element among the elements for the diagonally oriented guide hole 335 may be maintained as same as the VL in consideration of the movable distance of the locking rod 380 and a vertical length element among the elements for the diagonal direction of the guide hole 335 may be adjusted, so that the amount of operation work required for the operation button unit 120 for opening the console cover 100 may be adjusted.

As an example, the vertical length element of the guide hole 335 may be adjusted to the HL1 having a relatively short length or may be adjusted to the HL2 having a relatively long length. This may be understood as maintaining the horizontal length element as same as the VL and adjusting an angle inclined in the diagonal direction with respect to the longitudinal direction to A1 or A2.

As such, by adjusting the angle of the guide hole 335 inclined in the diagonal direction, the amount of operation work required for the operation button unit 120 for opening the console cover 100 may be adjusted. That is, by adjusting the guide hole 335, the work amount required by the passenger to open the console cover 100 may be adjusted.

Figure 11:
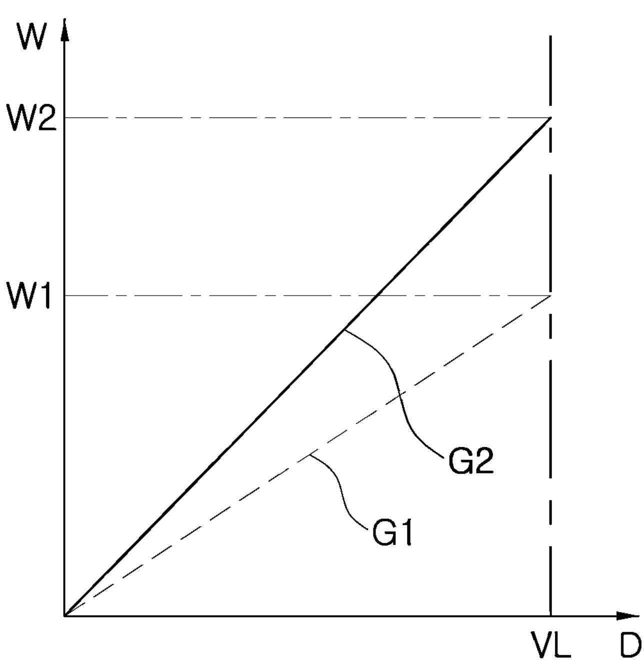

Referring to FIG. 11, the X-axis refers to a movement distance D of the locking rod 380, the Y-axis refers to an amount of operation work W applied to the operation button unit 120, a graph G1 is a graph corresponding to FIG. 10A, and a graph G2 is a graph corresponding to FIG. 10B.

In order to open the console cover 100, the locking rod 380 is required to be moved by a movement distance VL. Accordingly, in FIG. 10A, in order to move the locking rod 380 by the movement distance VL, the center rod 320 is required to be moved by HL1 in the longitudinal direction. To this end, the console cover 100 is capable of being opened only when the amount of operation work corresponding to the movement distance HL1 of the center rod 320 is applied to the operation button unit 120.

In contrast, in FIG. 10B, in order to move the locking rod 380 by the movement distance VL, the center rod 320 is required to be moved by the HL2 in the longitudinal direction. Accordingly, the console cover 100 is capable of being opened only when the amount of operation work W2 corresponding to the movement distance HL2 of the center rod 320 is applied to the operation button unit 120.

That is, in FIG. 10A, the console cover 100 is capable of being opened when the passenger applies the relatively small amount of operation work W1, so that the passenger is capable of opening the console cover 100 by operating the operation button unit 120 with a relatively small force. In contrast, in FIG. 10B, the console cover 100 is capable of being opened when the passenger applies the relatively large amount of operation work W2, so that the passenger is capable of opening the console cover 100 by operating the operation button unit 120 with a relatively large force.

As another example, referring to FIG. 12A and FIG. 12B, the amount of operation work required for operating the operation button unit 120 for opening the console cover 100 may be adjusted by forming the guide hole 335 in an arc shape.

FIG. 12A is a case in which the guide hole 335 is formed in an arc shape that protrudes forward in the diagonal direction. In FIG. 12A, the movement distance of the locking rod 380 is not large at the beginning when the passenger begins to operate the operation button unit 120, and the movement distance of the locking rod 380 becomes large after a predetermined point in time.

That is, in the guide hole 335 formed in the arc shape that protrudes forward in the diagonal direction, the horizontal movement of the locking adjustment protrusion 371 is small and the vertical movement of the locking adjustment protrusion 371 is large at the beginning of the movement of the locking adjustment protrusion 371 moved through the guide of the guide hole 335 according to the start of the operation of the operation button unit 120 from the normal state position, so that the amount of operation work required by the passenger is not significantly required to move the locking rod 380.

As the locking adjustment protrusion 371 passes a middle end of the guide hole 335 and is moved close to an end of the guide hole 335, the vertical movement of the locking adjustment protrusion 371 becomes small and the horizontal movement of the locking adjustment protrusion 371 becomes large, so that the amount of operation work required by the passenger is accordingly required to move the locking rod 380.

FIG. 12B is a case in which the guide hole 335 is formed in an arc shape that protrudes rearward in the diagonal direction. In FIG. 12B, the movement distance of the locking rod 380 is large at the beginning when the passenger begins to operate the operation button unit 120, and the movement distance of the locking rod 380 becomes small after a predetermined point in time.

That is, in the guide hole 335 formed in the arc shape that protrudes rearward in the diagonal direction, the vertical movement of the locking adjustment protrusion 371 is small and the horizontal movement of the locking adjustment protrusion 371 is large at the beginning of the movement of the locking adjustment protrusion 371 moved through the guide of the guide hole 335 according to the start of the operation of the operation button unit 120 from the normal state position, so that the amount of operation work required by the passenger is accordingly required to move the locking rod 380.

As the locking adjustment protrusion 371 passes the middle end of the guide hole 335 and is moved close to the end of the guide hole 335, the horizontal movement of the locking adjustment protrusion 371 becomes small and the vertical movement of the locking adjustment protrusion 371 becomes large, so that the amount of operation work required by the passenger is not significantly required to move the locking rod 380.

Figure 13A:
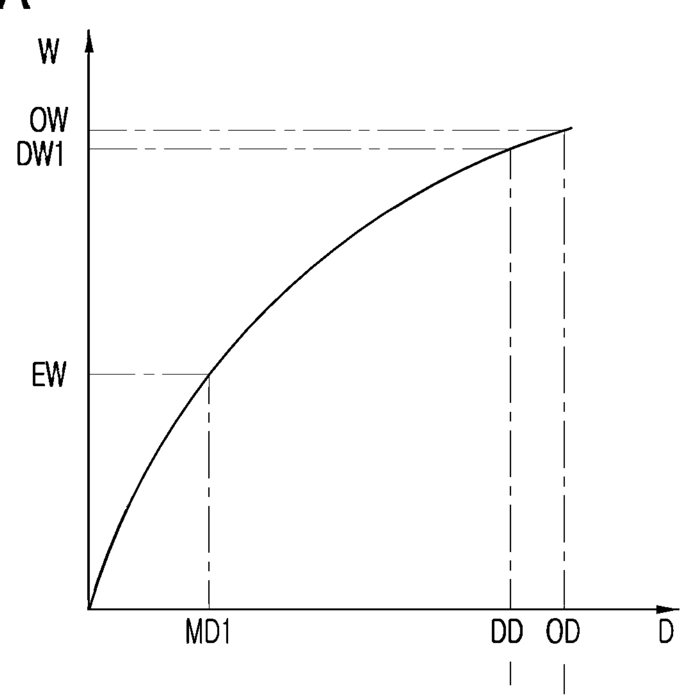
Figure 13B:
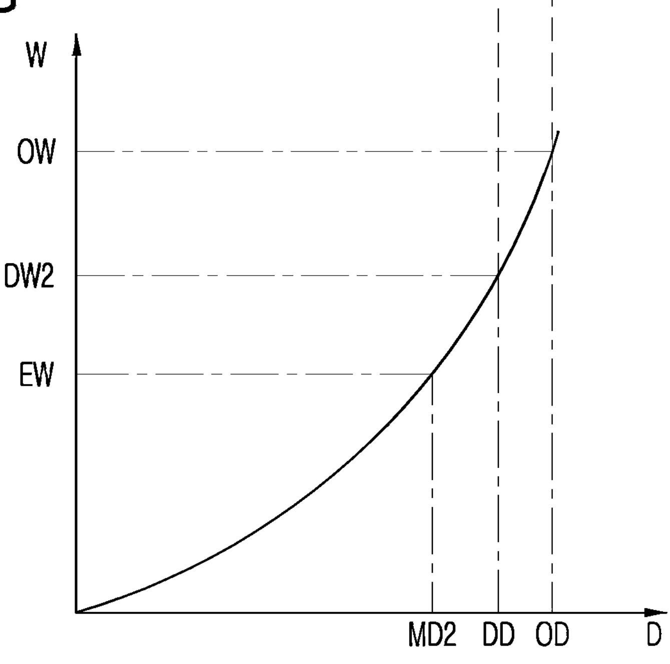

Referring to FIG. 13A and FIG. 13B, the X-axis refers to the movement distance D of the locking rod 380, the Y-axis refers to the amount of operation work W applied to the operation button unit 120, a graph shown in FIG. 13A is a graph corresponding to FIG. 12A, and a graph shown in FIG. 13B is a graph corresponding to FIG. 12B.

When the passenger applies the amount of operation work of EW for a predetermined time from the beginning of operating the operation button unit 120, the movement distance of the locking rod 380 reaches MD1 in the guide hole 335 as illustrated in FIG. 12A, and the movement distance of the locking rod 380 reaches MD2 in the guide hole 335 as illustrated in FIG. 12B.

That is, from the beginning when the passenger operates the operation button unit 120 to a predetermined point, when the passenger applies the same amount of operation work as EW, the locking rod 380 is moved more when the guide hole 335 as shown in FIG. 12B than when the guide hole 335 as shown in FIG. 12A is applied.

In addition, until the locking rod 380 reaches a critical position DD where the locking rod 380 is capable of being easily deviated from the locking hole 555 by a small impact or small shaking, a relatively large amount of operation work of DW1 is required when the guide hole 335 as shown in FIG. 12A is applied, but a relatively small amount of operation work of DW2 is required when the guide hole 335 as shown in FIG. 12B is applied.

Looking at the overall perspective, in both cases in FIG. 12A and FIG. 12B, in order for the locking rod 380 to reach a distance OD where the locking rod 380 is fully pulled out from the locking hole 555, the same amount of operation work as OW may be required for the operation button unit 120.

However, even though the same amount of operation work as EW is applied to the operation button unit 120 at the beginning of operating the operation button unit 120, the locking rod 380 is moved much more in the case in FIG. 12B than in the case in FIG. 12A, and the locking rod 380 in the case in FIG. 12B reaches the critical position DD when the relatively small amount of operation work of DW2 is applied.

That is, when the guide hole 335 is formed in the arc shape that protrudes forward in the diagonal direction, the console cover 100 is not opened by a small force applied from, for example, the passenger or an impact, so that the locked state of the console cover 100 is more stably maintained.

As described above, in the present disclosure, the amount of operation work required for the operation button unit 120 for opening the console cover 100 is capable of being adjusted by adjusting an angle inclined in the diagonal direction relative to the longitudinal direction with respect to the guide hole 335 provided in the arm 330 or by forming the guide hole 335 in the arc shape that protrudes forward or rearward in the diagonal direction, so that an operation feeling that the passenger feels when the passenger operates the operation button unit 120 is capable of being variously modified and also the closed state of the console cover 100 is capable of being stably maintained.

Figure 14:
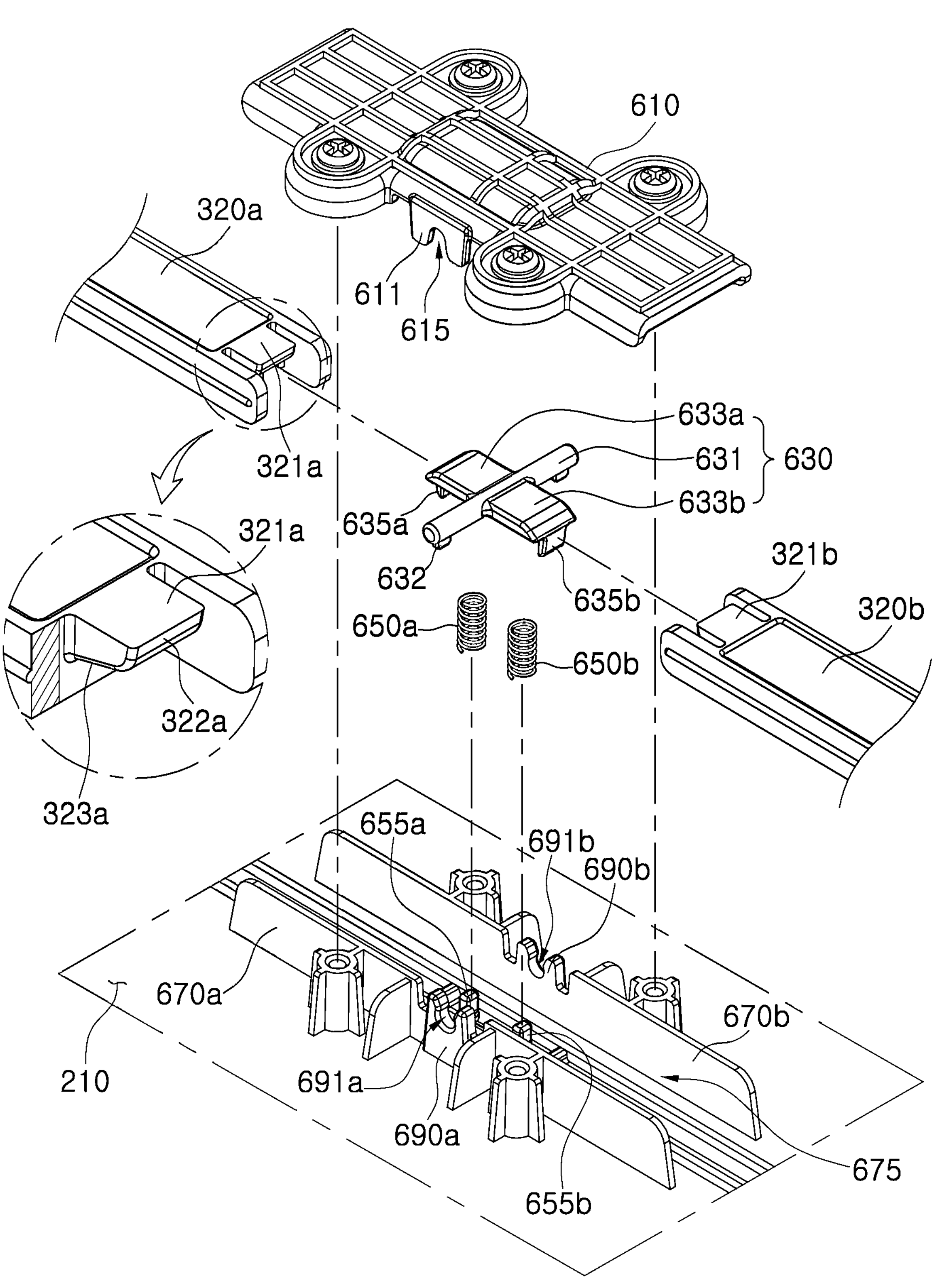
FIG. 14 is an exploded perspective view illustrating an embodiment of a console opening direction adjustment unit in the console device according to the present disclosure.

Furthermore, in the present disclosure, the console opening direction adjustment unit 600 configured to restrict the console cover 100 from being opened in the opposite direction when the console cover 100 is opened in either the front or rear direction. FIG. 14 illustrates an exploded perspective view of an embodiment of the console opening direction adjustment unit in the console device according to the present disclosure.

The console opening direction adjustment unit 600 may be disposed between the front rod member 310*a* and the rear rod member 310*b*. The front center rod 320*a* of the front rod member 310*a* and the rear center rod 320*b* of the rear rod member 310*b* may be disposed such that each distal end of the front center rod 320*a* and the rear center rod 320*b* corresponds to each other along the longitudinal direction. That is, the front center rod 320*a* and the rear center rod 320*b* may be disposed on a same virtual vertical line along the longitudinal direction. The console opening direction adjustment unit 600 may be disposed such that the console opening direction adjustment unit 600 includes a portion of the distal end of the front center rod 320*a* and a portion of the distal end of the rear center rod 320*b*.

The console opening direction adjustment unit 600 may include, among others, a fixing cover 610, an opening adjustment member 630, left and right guide partition walls 670*a* and 670*b*, opening adjustment member mounting parts 690*a*, 690*b*, and 611, a front wing spring 650*a*, and a rear wing spring 650*b*.

A front push bar 321*a* may be provided at the distal end of the front center rod 320*a*. The front push bar 321*a* may extend rearward from the front center rod 320*a*. The front push bar 321*a* may be provided with a catching surface 322*a* and a guide surface 323*a* that are in contact with the opening adjustment member 630.

The catching surface 322*a* may be formed as a upright surface facing downward from an upper portion of an upper distal end of the front push bar 321*a*, or may be formed as an inclined surface having a steep first inclination angle. Here, the first inclination angle of the catching surface 322*a* may be set such that the first inclination angle of the catching surface 322*a* corresponds to a surface of a front restriction protrusion 635*a* when a front wing 633*a* which will be described later is moved upward. The first inclination angle of the catching surface 322*a* is defined as an acute angle between a virtual extension surface of the catching surface 322*a* and the longitudinal direction.

The guide surface 323*a* may be formed as an inclined surface having a second inclination angle that has a gentle inclination angle from a lower distal end of the catching surface 322*a* in a longitudinal direction toward an inside of the front push bar 321*a*. Here, the second inclination angle of the guide surface 323*a* may be set such that the guide surface 323*a* can guide the front wing 633*a* which will be described later to be moved smoothly downward. The second inclination angle of the guide surface 323*a* is defined as an acute angle between a virtual extension surface of the guide surface 323*a* and the longitudinal direction.

The first inclination angle may be larger than the second inclination angle. Preferably, the first inclination angle may be set corresponding to an angle formed by an outer side surface of the front restriction protrusion 635*a* (i.e., an acute angle formed between a virtual extension of the outer side surface of the front restriction 635*a* and the longitudinal direction) in a state in which the front wing 633*a* is moved upward according to a rotation of a rotation shaft 631 of the opening adjustment member 630.

In addition, the second inclination angle may be set corresponding to an angle formed by an upper surface of the front wing 633*a* (i.e., an acute formed between a virtual extension of the upper surface of the front wing 633*a* and the longitudinal direction) in a state in which the front wing 633*a* is moved downward so that the guide surface 323*a* is capable of pushing the front wing 633*a* and moving the front wing 633*a* gradually downward as the guide surface 323*a* slides up along the upper surface of the front wing 633*a*.

A rear push bar 321*b* may be provided at the distal end of the rear center rod 320*b*. The rear push bar 321*b* may be provided with a catching surface and a guide surface, which is similar to the front push bar 321*a*. Since the configuration of the rear push bar 321*b* is symmetrically similar to front push bar 321 and is capable of being understood through the description of the front push bar 321*a*, a detailed description of the rear push bar 321*b* will be omitted.

The left and right guide partition walls 670*a* and 670*b* may protrude toward the upper portion of the base plate 210.

The left and right guide partition walls 670*a* and 670*b* may be provided corresponding to both sides of each distal end region of the front and rear center rods 320*a* and 320*b*. A separation distance between the left guide partition wall 670*a* and right guide partition walls 670*b* may correspond to a width between both sides of the distal end region of the front center rod 320*a* and also between both sides of the distal end region of the rear center rod 320*b*. A direction perpendicular to the left and right guide partition walls may be referred to as a width direction.

The left and right guide partition walls 670*a* and 670*b* may provide a movement passage 675 of the front center rod 320*a* and the rear center rod 320*b*.

The left and right guide partition walls 670*a* and 670*b* guide the front center rod 320*a* and the rear center rod 320*b* to be moved only along the longitudinal direction and prevent the front center rod 320*a* and the rear center rod 320*b* from deviating toward a side from the longitudinal direction.

A center region of the left guide partition wall 670*a* may be provided with an opening adjustment member lower end mounting part 690*a*. Likewise, a center region of the right guide partition wall 670*b* may be provided with an opening adjustment member lower end mounting part 690*b*. Opening adjustment member lower end mounting grooves 691*a* and 691*b* may be provided in the opening adjustment member lower end mounting parts 690*a* and 690*b*. The rotation shaft 631 of the opening adjustment member 630 may be mounted in the opening adjustment member lower end mounting grooves 691*a* and 691*b* by being fitted to the opening adjustment member lower end mounting grooves 691*a* and 691*b*. The opening adjustment member lower end mounting parts 690*a* and 690*b* may support the opening adjustment member 630 and may support the rotation shaft 631 of the opening adjustment member 630 such that the rotation shaft 631 is capable of being rotated.

The opening adjustment member 630 may include the front wing 633*a*, a rear wing 633*b*, and the rotation shaft 631.

The rotation shaft 631 may be disposed in a direction perpendicular to the longitudinal direction of the opening adjustment member 630. The front wing 633*a* and the rear wing 633*b* may be provided such that the front wing 633*a* and the rear wing 633*b* extend forward and rearward from side surfaces of the rotation shaft 631 with respect to the rotation shaft 631 in the front direction and the rear direction of the longitudinal direction.

The rotation shaft 631 may be inserted into and mounted on the opening adjustment member lower end mounting parts 690*a* and 690*b* of the guide partition walls 670*a* and 670*b* and may be inserted into and mounted on an opening adjustment member upper end mounting part 611 of the fixing cover 610 such that the rotation shaft 631 is capable of being rotated.

The rotation shaft 631 may be rotated between the front wing 633*a* and the rear wing 633*b* having a rotational axis in the width direction according to a downward movement of any one of the front wing 633*a* and the rear wing 633*b*, thereby moving the other one upward.

Each catching protrusion 632 may be provided on both distal ends of the rotation shaft 631, and a position of the rotation shaft 631 in left and right directions (i.e., the width direction) may be maintained as each of the catching protrusions 632 of the rotation shaft 631 is in contact with each outer surface of the opening adjustment member lower end mounting parts 690*a* and 690*b* of the guide partition walls 670*a* and 670*b*.

The distal end of the front wing 633*a* may be provided with the front restriction protrusion 635*a* that extends downward. In addition, the distal end of the rear wing 633*b* may be provided with a rear restriction protrusion 635*b* that extends downward.

The front wing spring 650*a* may be disposed below the front wing 633*a*. When the front wing 633*a* is moved downward, the front wing spring 650*a* may be pressed, so that the front wing spring 650*a* may apply an elastic force upward to the front wing 633*a*. Furthermore, the front wing spring 650*a* may push the front wing 633*a* upward with a restoration force, so that the position of the front wing 633*a* may be restored.

The rear wing spring 650*b* may be disposed below the rear wing 633*b*. When the rear wing 633*b* is moved downward, the rear wing spring 650*b* may be pressed, so that the rear wing spring 650*b* may apply an elastic force upward to the rear wing 633*b*. Furthermore, the rear wing spring 650*b* may push the rear wing 633*b* upward with a restoration force, so that the position of the rear wing 633*b* may be restored.

The fixing cover 610 may be mounted on the base plate 210 such that the fixing cover 610 fixedly covers the left and right guide partition walls 670*a* and 670*b* and the opening adjustment member 630. The cover 610 may be coupled with the base plate 210 by bolt/nut rivet, or similar fixing mechanisms.

The opening adjustment member upper end mounting part 611 may be provided on each center region at the left side surface and the right side surface of the fixing cover 610. An opening adjustment member upper end mounting groove 615 may be provided in the opening adjustment member upper end mounting part 611. The rotation shaft 631 of the opening adjustment member 630 may be mounted in the opening adjustment member upper end mounting groove 615 by being fitted to the opening adjustment member upper end mounting groove 615.

Since the opening adjustment member upper end mounting groove 615 and the opening adjustment member lower end mounting parts 690*a* and 690*b* support the opening adjustment member 630 and prevent the separation of the opening adjustment member 630, the opening adjustment member 630 is capable of being stably rotated around the rotation shaft 631.

When the console cover 100 is opened in any one direction among the front direction and the rear direction, opening of the console cover 100 in the other direction is restricted by the console opening direction adjustment unit 600. An operation of the console opening direction adjustment unit 600 will be described with reference to an embodiment.

Figure 15:
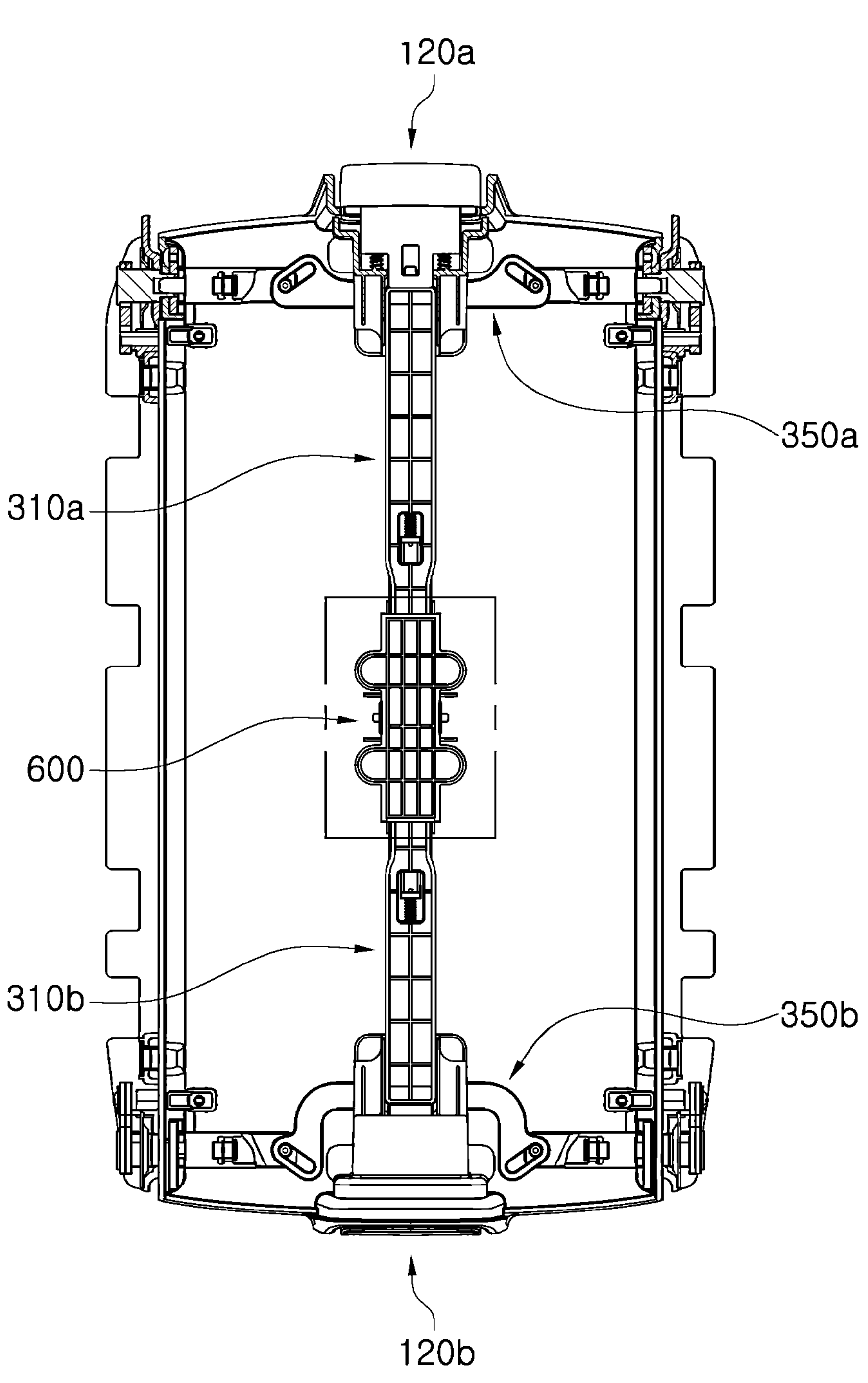
FIG. 15 to FIG. 16B are views illustrating operation diagrams of an embodiment of a normal state in which the console cover is closed in the console device according to the present disclosure.
Figure 16A:
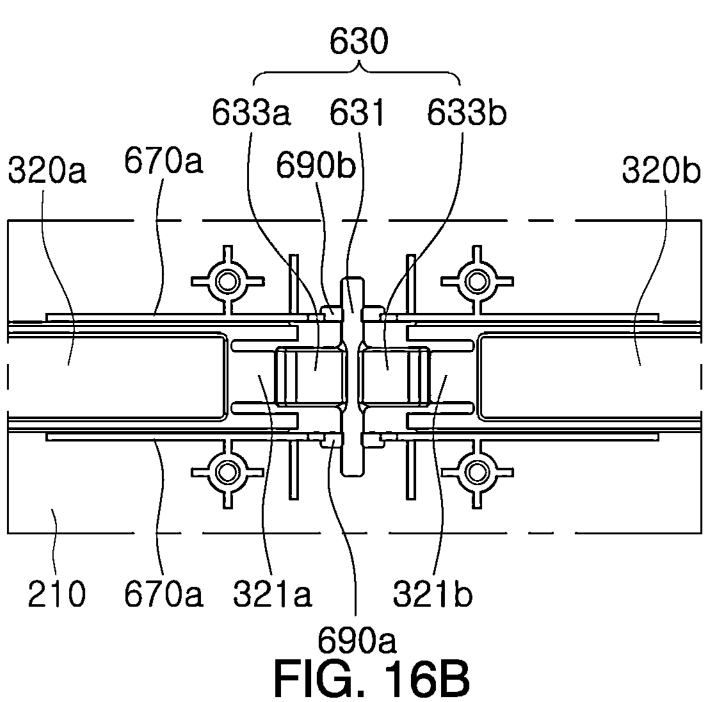
Figure 16B:
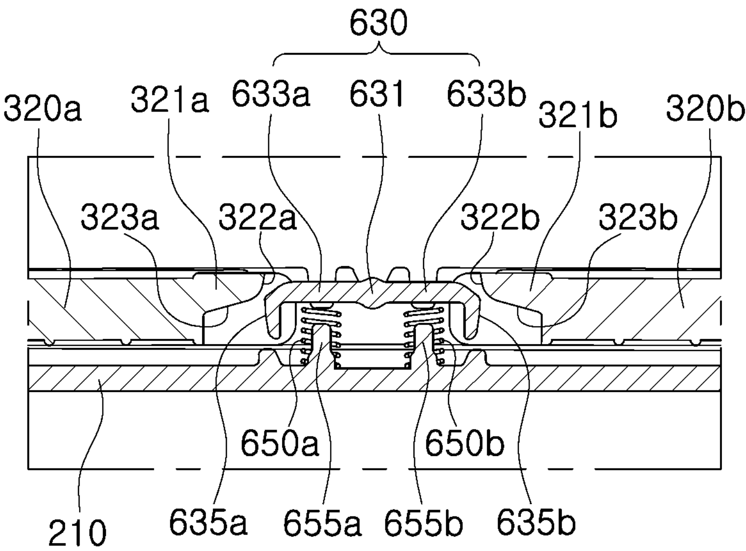

FIG. 15 to FIG. 16B are views illustrating operation diagrams of an embodiment of the normal state in which the console cover is closed in the console device according to the present disclosure. FIG. 16A is a plan view (i.e., a top view) illustrating the console opening direction adjustment unit 600 in a state in which the fixing cover 610 is removed, and FIG. 16B is a cross-sectional view illustrating the console opening direction adjustment unit 600 in a state in which the fixing cover 610 is removed.

The console cover opening and closing device 200 may include, among others, the front operation button unit 120*a*, the front rod member 310*a*, and the front locking control unit 350*a* for opening and closing the console cover in the front direction. The console cover opening and closing device 200 may also include, among others, the rear operation button unit 120*b*, the rear rod member 310*b*, and the rear locking control unit 350*b* for opening and closing the console cover in the rear direction.

The front operation button unit 120*a*, the front rod member 310*a*, the front locking control unit 350*a*, the rear operation button unit 120*b*, the rear rod member 310*b*, and the rear locking control unit 350*b* may be disposed symmetrically to each other in the front direction and the rear direction.

In addition, the console opening direction adjustment unit 600 may be disposed between the front rod member 310*a* and the rear rod member 310*b*. More specifically, the console opening direction adjustment unit 600 may be disposed such that the console opening direction adjustment unit 600 includes the distal end region of the front center rod 320*a* of the front rod member 310*a* and the distal end region of the rear center rod 320*b* of the rear rod member 310*b*.

In the normal state in which the front side and the rear side of the console cover are closed, the distal end of the front center rod 320*a* and the distal end of the rear center rod 320*b* maintain a separation distance in the normal state position while both distal ends of the front and rear center rods 320*a* and 320*b* are disposed between the left and right guide partition walls 670*a* and 670*b* of the console opening direction adjustment unit 600. In this state, the front wing 633*a* and the rear wing 633*b* of the opening adjustment member 630 maintain a balanced state in which neither the front wing 633*a* nor the rear wing 633*b* is tilted.

Preferably, the front wing 633*a* is maintained at a predetermined height by the elastic force of the front wing spring 650*a*, the rear wing 633*b* is maintained at a predetermined height by the elastic force of the rear wing spring 650*b*, and the elastic force of the front wing spring 650*a* and the elastic force of the rear wing spring 650*b* are balanced, maintaining the normal state in which the rotation shaft 631 does not rotate.

Figure 17:
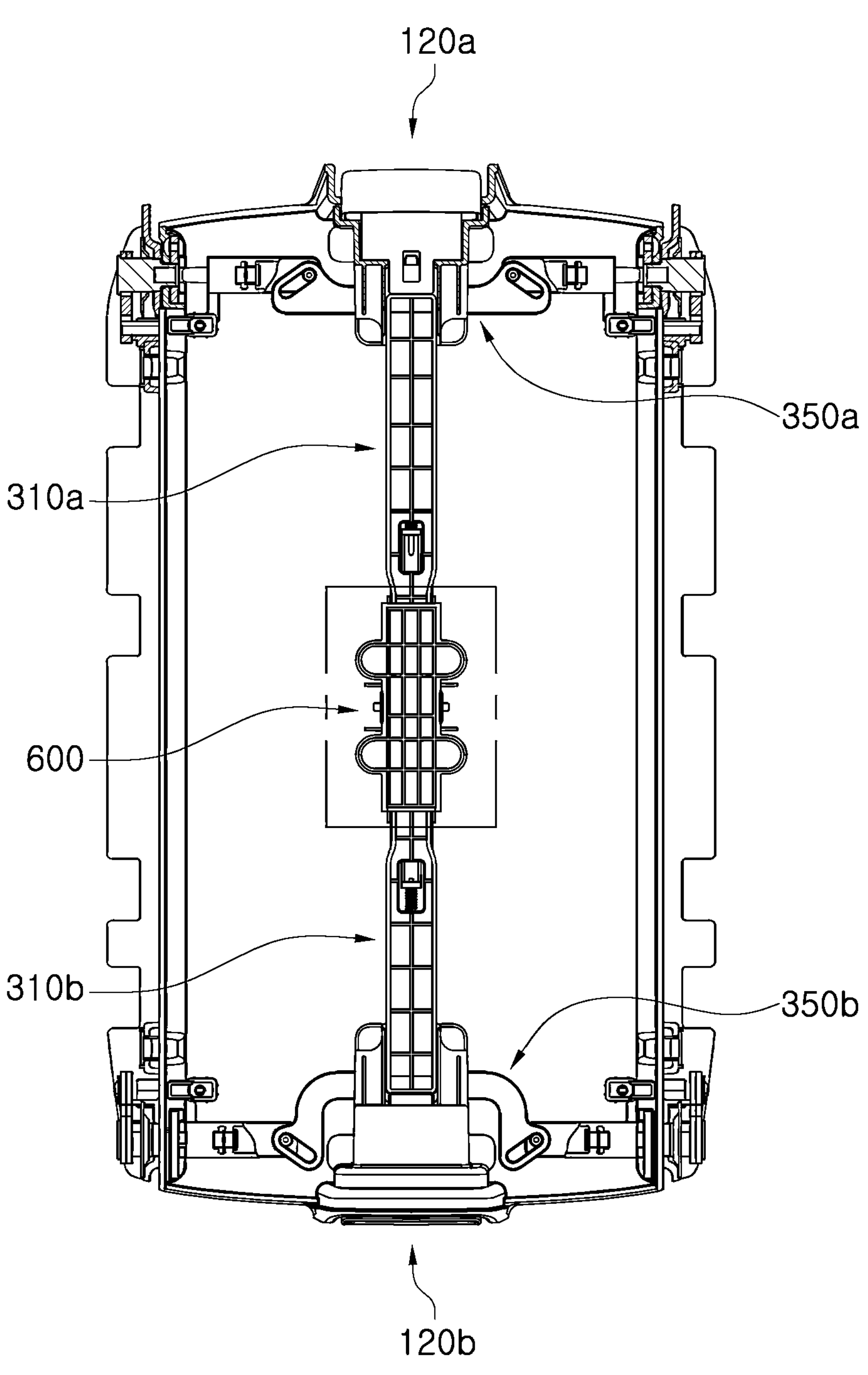
FIG. 17 to FIG. 18B are views illustrating operation diagrams of an embodiment of a front direction operation state in which the console opening direction adjustment unit restricts a rear direction opening of the console cover according to a front direction opening of the console cover in the console device according to the present disclosure.
Figure 18A:
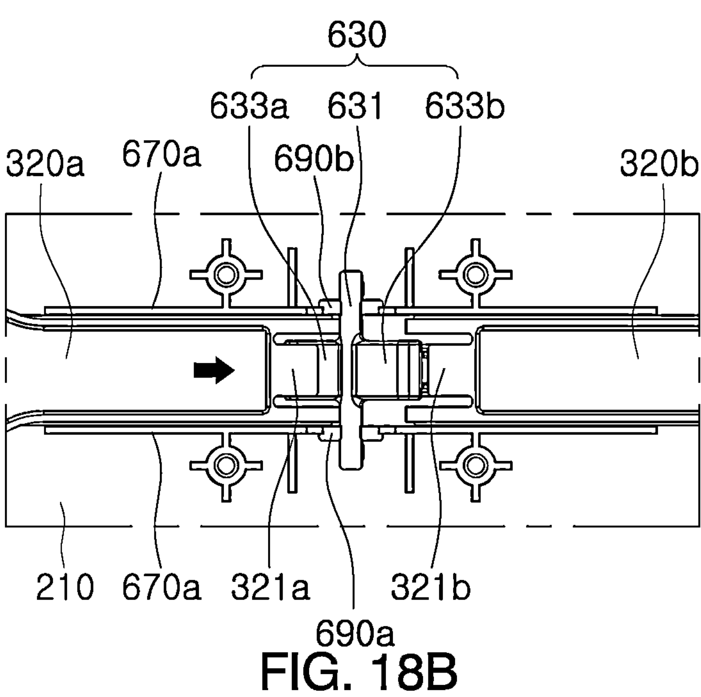
Figure 18B:
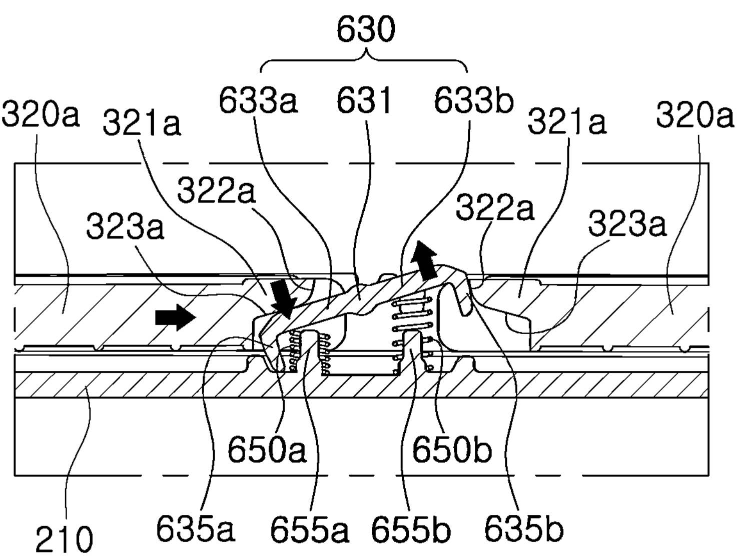

FIG. 17 to FIG. 18B are views illustrating operation diagrams of an embodiment showing a front direction operation state, where the console opening direction adjustment unit restricts a rear direction opening of the console cover when the console cover is opened in the front direction according to the present disclosure.

FIG. 18A is a plan view illustrating the console opening direction adjustment unit 600 in a state in which the fixing cover 610 is removed, and FIG. 18B is a cross-sectional view illustrating the console opening direction adjustment unit 600 in a state in which the fixing cover 610 is removed.

The front center rod 320*a* of the front rod member 310*a* is moved rearward in the longitudinal direction according to the operation of the front operation button unit 120*a*. As the front center rod 320*a* is moved rearward in the longitudinal direction, the front locking control unit 350*a* releases a front side locking of the console cover, so that the console cover is capable of being opened in the front direction.

As illustrated in FIG. 18A and FIG. 18B, the front center rod 320*a* may be pushed and moved rearward in the longitudinal direction on the movement passage 675 between the left and right guide partition walls 670*a* and 670*b* according to the operation of the front operation button unit 120*a*.

As the front center rod 320*a* is moved rearward in the longitudinal direction, the guide surface 323*a* of the front push bar 321*a* provided at the distal end of the front center rod 320*a* may be in contact with the upper surface of the front wing 633*a* of the opening adjustment member 630.

As the rotation shaft 631 of the opening adjustment member 630 is mounted and supported on the opening adjustment member lower end mounting parts 690*a* and 690*b* provided on the left and right guide partition walls 670*a* an 670*b*, the rotation shaft 631 is capable of being rotated but the position of the rotation shaft 631 is fixed. Accordingly, as the guide surface 323*a* of the front push bar 321*a* is gradually moved rearward in the longitudinal direction, the guide surface 323*a* may push the front wing 663*a* in the diagonal direction such that the front wing 663*a* is moved downward. As the front wing 663*a* is moved downward, the rotation shaft 631 may move the rear wing 633*b* upward by being rotated.

As an example, as the guide surface 323*a* of the front push bar 321*a* is gradually moved rearward in the longitudinal direction, the guide surface 323*a* may move the front wing 663*a* downward by pushing the upper surface of the front wing 663*a* to the second inclination angle. This allows the rotation shaft 631 of the opening adjustment member 630 to move, by being rotated, the rear wing 633*b* upward to the second inclination angle.

When the rear wing 633*b* is moved upward, the rear restriction protrusion 635*b* may be moved to a height corresponding to a height of the catching surface 322*a* of the rear push bar 321*b* provided at the distal end of the rear center rod 320*b*.

As the rear restriction protrusion 635*b* of the rear wing 633*b* is moved upward to the height of the catching surface 322*a* of the rear push bar 321*b* and is positioned, the catching surface 322*a* of the rear push bar 321*b* provided at the distal end of the rear center rod 320*b* may be in contact with the rear restriction protrusion 635*b* of the rear wing 633*b*.

In a state in which the catching surface 322*a* of the rear push bar 321*b* and the rear restriction protrusion 635*b* of the rear wing 633*b* are in contact with each other, the forward movement of the rear center rod 320*b* in the longitudinal direction may be restricted.

Therefore, even when a passenger attempts to operate the rear operation button unit 120*b*, the rear center rod 320*b* cannot be moved forward in the longitudinal direction. This allows the rear opening of the console cover to be restricted as the rear center rod 320*b* cannot be moved forward in the longitudinal direction.

That is, when the front opening of the console cover is performed, the forward movement of the rear center rod 320*b* in the longitudinal direction is restricted by the console opening direction adjustment unit 600. Thereby, the rear side of the console cover cannot be opened through the rear operation button unit 120*b* and the closed state of the rear side of the console cover may be maintained.

In addition, when the rear opening of the console cover is performed, the rearward movement of the front center rod 320*a* in the longitudinal direction is restricted by the console opening direction adjustment unit 600. Thereby, the front side of the console cover cannot be opened and the closed state of the front side of the console cover may be maintained. This is symmetrically opposite to an embodiment described with reference to FIG. 17 to FIG. 18B. Therefore, the description of the rear opening of the console cover will be omitted.

As such, in the present disclosure, by incorporating the console opening direction adjustment unit, the opening direction of the console cover in the console device that can open in both directions can be selectively controlled. This solves the problem of the front side and the rear side of the console cover opening simultaneously and causing the console cover to detach from the console device.

Although the embodiments of the present disclosure have been disclosed for illustrative purposes, those skilled in the art will appreciate that various modifications, additions, and substitutions are possible, without departing from the scope and spirit of the present disclosure. Also, it is noted that any one feature of an embodiment of the present disclosure described in the specification may be applied to another embodiment of the present disclosure. Similarly, the present invention encompasses any embodiment that combines features of one embodiment and features of another embodiment. Accordingly, embodiments disclosed in the present disclosure are provided for describing the present disclosure and are not intended to limit the technical ideas of the present disclosure. The technical ideas of the present disclosure are not limited to the embodiments. The scope of the present disclosure should be construed as being covered by the scope of the appended claims, and all technical ideas falling within the scope of the claims should be construed as being included in the scope of the present disclosure.

What is claimed is:

1. A console device comprising:

a front rod member configured to be moved rearward in a longitudinal direction according to an operation of a front operation button unit;

a rear rod member configured to be moved forward in the longitudinal direction according to an operation of a rear operation button unit; and a console opening direction adjustment unit comprising an opening adjustment member configured such that a position of the opening adjustment member in the longitudinal direction is fixed between the front rod member and the rear rod member and the opening adjustment member is operable to rotate around a rotation shaft, wherein the opening adjustment member is configured such that, when one side of the opening adjustment member is pushed by either one of a rearward movement of the front rod member or a forward movement of the rear rod member, the one side of the opening adjustment member is rotated around the rotation shaft and moved downward, and an opposite side of the opening adjustment member is rotated around the rotation shaft and moved upward, so that the opposite side of the opening adjustment member is in contact with the other one of the front rod member or the rear rod member, thereby restricting a movement in the longitudinal direction of the other one of the front rod member or the rear rod member.

2. The console device of claim 1, wherein the front rod member comprises a front center rod configured to be moved rearward in the longitudinal direction according to the operation of the front operation button unit, and the rear rod member comprises a rear center rod configured to be moved forward in the longitudinal direction according to the operation of the rear operation button unit, wherein the console opening direction adjustment unit comprises:

the opening adjustment member comprising a front wing configured to be in contact with the front center rod, a rear wing configured to be in contact with the rear center rod, and the rotation shaft between the front wing and the rear wing; and an opening adjustment member mounting part configured to fix a position of the rotation shaft of the opening adjustment member and to support the rotation shaft such that the rotation shaft is capable of being rotated.

3. The console device of claim 2, wherein the console opening direction adjustment unit further comprises left and right guide partition walls disposed in both left and right sides of the front center rod and the rear center rod, respectively, the left and right guide partition walls providing a movement passage therebetween and guiding the movement in the longitudinal direction of the front center rod and the rear center rod.

4. The console device of claim 3, wherein the opening adjustment member mounting part comprises an opening adjustment member lower end mounting part which is provided on the left and right guide partition walls and into which the rotation shaft of the opening adjustment member is inserted and mounted, the opening adjustment member lower end mounting part being configured to fix and support the position of the rotation shaft and to support the rotation of the rotation shaft.

5. The console device of claim 3, wherein the console opening direction adjustment unit further comprises a fixing cover mounted on a base plate to cover the opening adjustment member and the left and right guide partition walls, and the opening adjustment member mounting part comprises an opening adjustment member upper end mounting part which is provided on both left and right side surfaces of the fixing cover and into which the rotation shaft of the opening adjustment member is inserted and mounted, the opening adjustment member upper end mounting part being configured to fix and support the position of the rotation shaft and to support the rotation of the rotation shaft.

6. The console device of claim 2, wherein the front rod member and the rear rod member respectively comprise:

a front push bar provided at a distal end of the front center rod, the front push bar being configured to push the front wing downward according to the rearward movement of the front center rod when the front wing is in a normal position and configured to be restricted from the rearward movement by being in contact with the front wing when the front wing is in an upward position; and a rear push bar provided at a distal end of the rear center rod, the rear push bar being configured to push the rear wing downward according to the forward movement of the rear center rod when the rear wing is in a normal position and configured to be restricted from the forward movement by being in contact with the rear wing when the rear wing is in a upward position.

7. The console device of claim 6, wherein the front push bar and the rear push bar each comprise:

a catching surface formed as a upright surface on a distal end or formed as an inclined surface having a first inclination angle; and a guide surface formed as an inclined surface having a second inclination angle from a lower distal end of the catching surface, wherein the opening adjustment member comprises:

a front restriction protrusion that extends downward from a distal end of the front wing; and a rear restriction protrusion that extends downward from a distal end of the rear wing.

8. The console device of claim 7, wherein, as the front center rod is moved rearward in the longitudinal direction according to the operation of the front operation button unit, the guide surface of the front push bar pushes an upper surface of the front wing of the opening adjustment member downward by the second inclination angle causing the rotation shaft to rotate and the rear wing to move upward by the second inclination angle, so that the rear restriction protrusion is in contact with the catching surface of the rear push bar and the movement in the longitudinal direction of the rear center rod is restricted.

9. The console device of claim 7, wherein, as the rear center rod is moved frontward in the longitudinal direction according to the operation of the rear operation button unit, the guide surface of the rear push bar pushes an upper surface of the rear wing of the opening adjustment member downward by the second inclination angle causing the rotation shaft to rotate and the front wing to move upward by the second inclination angle, so that the front restriction protrusion is in contact with the catching surface of the front push bar and the movement in the longitudinal direction of the front center rod is restricted.

10. The console device of claim 2, wherein the console opening direction adjustment unit comprises:

a front wing spring disposed below the front wing, the front wing spring being configured to apply an elastic force to the front wing as the front wing is moved downward and the front wing spring is pressed, and the front wing spring being configured to push the front wing upward with a restoration force to restore a position of the front wing; and a rear wing spring disposed below the rear wing, the rear wing spring being configured to apply an elastic force to the rear wing as the rear wing is moved downward and the rear wing spring is pressed, and the rear wing spring being configured to push the rear wing upward with a restoration force to restore a position of the rear wing, wherein the opening adjustment member maintains a balanced state in which the opening adjustment member is not tilted due to a balance between the elastic force of the front wing spring and the elastic force of the rear wing spring when the front operation button unit and the rear operation button unit are not operated.

11. The console device of claim 1, further comprising:

a front locking control unit configured to control a front side opening and closing of a console cover according to the movement in the longitudinal direction of the front rod member; and a rear locking control unit configured to control a rear side opening and closing of the console cover according to the movement in the longitudinal direction of the rear rod member.

12. The console device of claim 11, wherein a simultaneous opening of the console cover at both front and rear sides is restricted by the console opening direction adjustment unit.

* * * * *